United States Patent [19]
Mitani

[11] Patent Number: 6,124,943
[45] Date of Patent: Sep. 26, 2000

[54] PRINTING APPARATUS AND METHOD FOR MANAGING PRINT DATA IN UNITS OF A BAND

[75] Inventor: Keisuke Mitani, Yokohama, Japan

[73] Assignee: Canon Kabushiki Kaisha, Tokyo, Japan

[21] Appl. No.: 08/968,668

[22] Filed: Nov. 12, 1997

[30] Foreign Application Priority Data

Nov. 18, 1996 [JP] Japan .................................. 8-306563

[51] Int. Cl.⁷ ............................. B41B 15/00; B41J 15/00; G06F 15/00
[52] U.S. Cl. ........................................................ 358/1.17
[58] Field of Search .................... 395/114–116; 382/232; 358/1.16, 1.17

[56] References Cited

U.S. PATENT DOCUMENTS 5,471,563 11/1995 Dennis et al. ........................... 395/114

*Primary Examiner*—Amelia Au
*Assistant Examiner*—F. E. Cooperrider
*Attorney, Agent, or Firm*—Fitzpatrick, Cella, Harper & Scinto

[57] ABSTRACT

Printing data is managed per band in the form of intermediate band and is output through a banding process. The bands which are estimated to undergo print overrun are subject to rendering before execution of printing out, by reserving temporary band rasters. When the temporary band rasters cannot be secured because of deficiency of the memory vacant capacity, the bands are managed in the form of compressed data by rendering and compressing the intermediate data using a normal band raster. When rendering of additional printing data is required for the compressed data, the compressed data is restored to the normal band raster, following which both the additional print data and the compressed data are subject to rendering and then compression again. If memory deadlock occurs, all the bands are compressed by selecting suitable one of plural compression types. In those processing steps, whether all the bands are to be compressed or not is determined and, based on the determination result, a process of compressing all the bands is executed so that the processing will not be disabled because of memory deficiency.

20 Claims, 29 Drawing Sheets

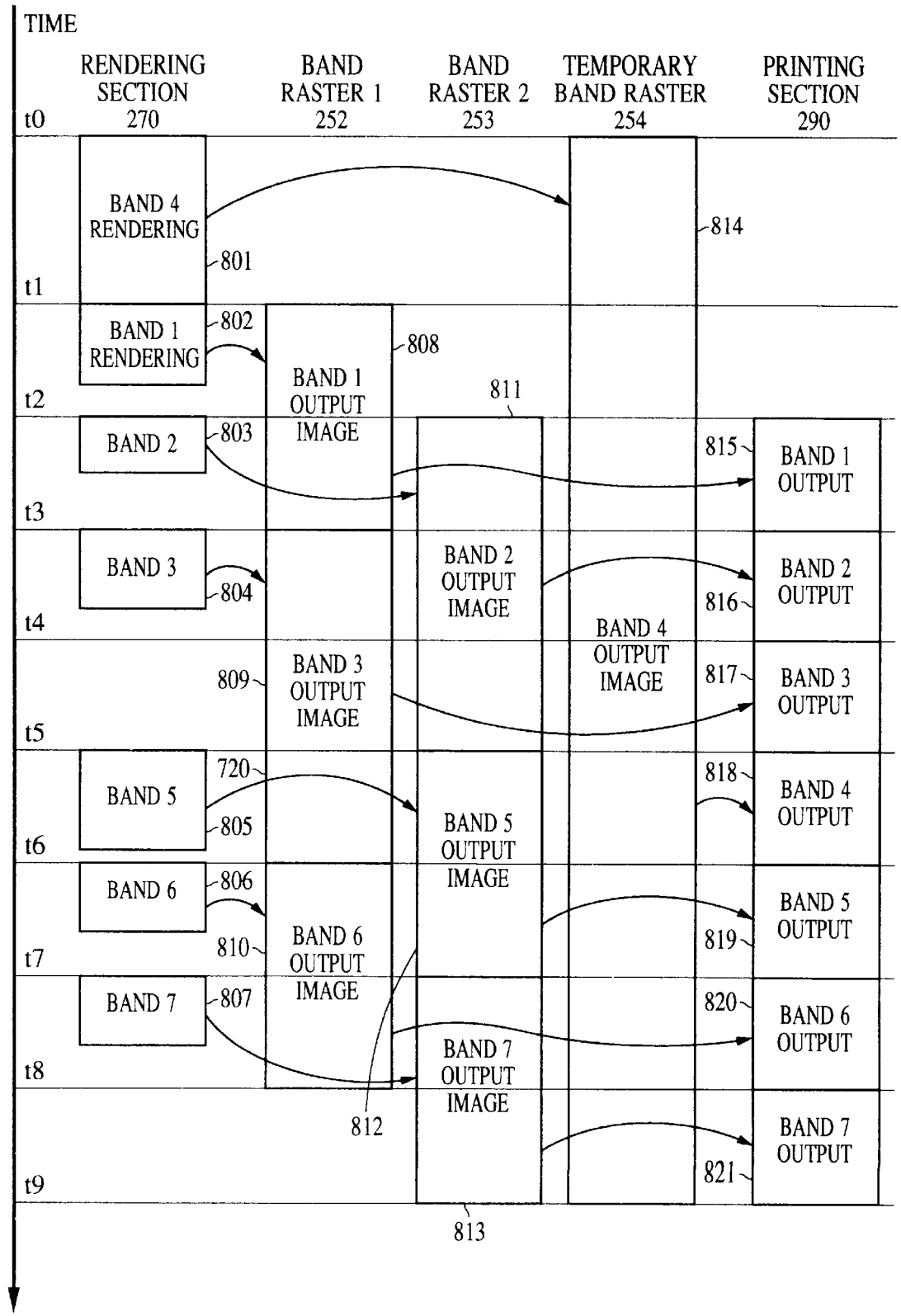

PRINTING APPARATUS AND METHOD FOR MANAGING PRINT DATA IN UNITS OF A BAND

BACKGROUND OF THE INVENTION

1. Field of the Invention

The present invention relates to printing apparatus such as a laser printer in which bit map data is created from intermediate data before printing, and a printing data processing method for use with the printing apparatus.

2. Description of the Related Art

There are widely used printing apparatus of the type receiving data (printing data) representing the contents to be printed and the printing format from a host computer, creating from the received data a bit map to be actually output (this step will be referred to as rendering hereinafter), and making printing output of the bit map onto a sheet of paper, for example, (this step will be referred to as shipping hereinafter).

In the printing apparatus of the type shipping an output bit map of 1 page after the rendering process, a memory for holding the output bit map of 1 page is always required. This results in a disadvantage that the memory capacity must be increased, particularly, in printing apparatus with a high degree of output resolution; hence the apparatus are very expensive.

There are also known printing apparatus of the (banding process) type that one page is divided into a plurality of units (bands) smaller than the page, a bit map of 1 band is created through rendering and then subject to shipping, and the rendering process for the next band is started in parallel with the shipping process for the previous band. Such a printing apparatus has a disadvantage that if the rendering time for the next band is longer than the shipping time for the previous band in the parallel process, a print overrun phenomenon occurs.

Another disadvantage is that because a memory for holding the printing data of 1 page is required in addition to the memory for holding the bit map resulted from rendering, the printing data of 1 page cannot be processed (this phenomenon will be referred to as memory deadlock hereinafter) if the memory capacity is deficient.

SUMMARY OF THE INVENTION

With a view of solving the disadvantages in the art as set forth above, the present invention provides printing apparatus and a printing data processing method with which printing data is processed in such a manner as being able to hold down the capacity required for a memory to a reasonable level, prevent print overrun and avoid memory deadlock, while inexpensively realizing a guarantee that all pages are surely printed.

A printing apparatus according to the present invention comprises means for managing printing data in units of band, means for performing rendering and shipping in units of band in parallel, means for performing data conversion of an image, means for restoring data resulted from the data conversion to the original data, means for merging the restored data with other data, means for shipping the restored data, means for determining whether the data conversion is to be performed or not, means for calculating a size of the printing data, means for calculating a data size after the data conversion, means for calculating a time required for rendering, means for changing the timing of rendering, and means for determining whether the timing of rendering is to be changed or not.

The present invention also provides a printing data processing method for use with a printing apparatus in which printing data is managed in units of band, and rendering and shipping are performed in units of band in parallel, the method comprising the steps of determining whether data conversion of image data is to be performed or not, managing image data through the data conversion, restoring data resulted from the data conversion to the original data, merging the restored data with other data, shipping the restored data, calculating a size of the printing data, calculating a data size after the data conversion, calculating a time required for rendering, changing the timing of rendering, and determining whether the timing of rendering is to be changed or not.

According to another aspect of the present invention, there is provided a printing apparatus in which printing data is subject to rendering in units of band, and rendering of one band and shipping of another band having been subject to rendering are performed in parallel, the printing apparatus comprising first determining means for determining whether rendering of the printing data in units of band is to be performed before the start of shipping of image data of one page, second determining means for determining whether image data in units of band resulted from rendering is to be subject to data conversion, data converting means for performing data conversion of image data in units of band, and means for restoring the image data resulted from the data conversion to the original image data, whereby when printing data to be subject to rendering still exists for the band having been subject to the data conversion by the data converting means, the image data resulted from the data conversion is restored to the original image data by the restoring means and the restored image data is merged with the image data resulted from the rendering of the printing data.

According to another aspect of the present invention, there is also provided a printing data processing method for use with a printing apparatus in which printing data is subject to rendering in units of band, and rendering of one band and shipping of another band having been subject to rendering are performed in parallel, the method comprising a first determining step of determining whether rendering of the printing data in units of band is to be performed before the start of shipping of image data of one page, a second determining step of determining whether image data in units of band resulted from rendering is to be subject to data conversion, a step of performing data conversion of image data in units of band in accordance with the determination made in the second determining step, and steps of restoring the image data resulted from the data conversion to the original image data, and merging the original image data restored by the restoring step with the image data resulted from the rendering of the printing data, when printing data to be subject to rendering still exists for the band having been subject to the data conversion by the data converting step.

Preferably, the data conversion of the image is performed by a compression process.

Preferably, the data conversion of the image is performed by a resolution lowering process.

Preferably, the data conversion of the image is performed by a gradation lowering process.

Preferably, when the data conversion is performed, determination is also made as to which one of plural data conversion types is employed.

Preferably, when calculating the data size after the data conversion, the data size is calculated by estimating a size of the compressed data based on the compression type.

Preferably, the timing of rendering is changed by reserving a temporary raster memory and performing rendering of the data into the temporary raster memory prior to shipping of the data.

Preferably, the determination as to whether the timing of rendering is to be changed or not is made per band.

Preferably, the determination as to whether the timing of rendering of each band is to be changed or not is made by comparing a band rendering time with a threshold determined from a band height and a paper feeding speed.

Preferably, the determination as to whether the timing of rendering of each band is to be changed or not is made by comparing a band rendering time with a threshold determined from a time period from the end of rendering of the previous band to the start of rendering of the relevant band.

Other objects and advantages of the present invention will be more apparent from referring to the accompanying drawings, the following detailed description, and the claims.

BRIEF DESCRIPTION OF THE DRAWINGS

FIG. 9 is a time chart for explaining the timed relationship between rendering and printing output using a temporary band raster in the process of avoiding print overrun in Embodiment 1 of the present invention.

DETAILED DESCRIPTION OF THE PREFERRED EMBODIMENTS

Preferred embodiments of the present invention will be described with reference to the accompanying drawings.
Embodiment 1
1. Construction of Printing Apparatus First, the construction of a laser beam printer (page printer) suitable for application of Embodiment 1 of the present invention thereto will be explained with reference to FIG. 1. It is needless to say that printing apparatus to which the present invention is applicable are not limited to laser beam printers, but may be ink jet printers and so forth employing other printing methods.

Figure 1:
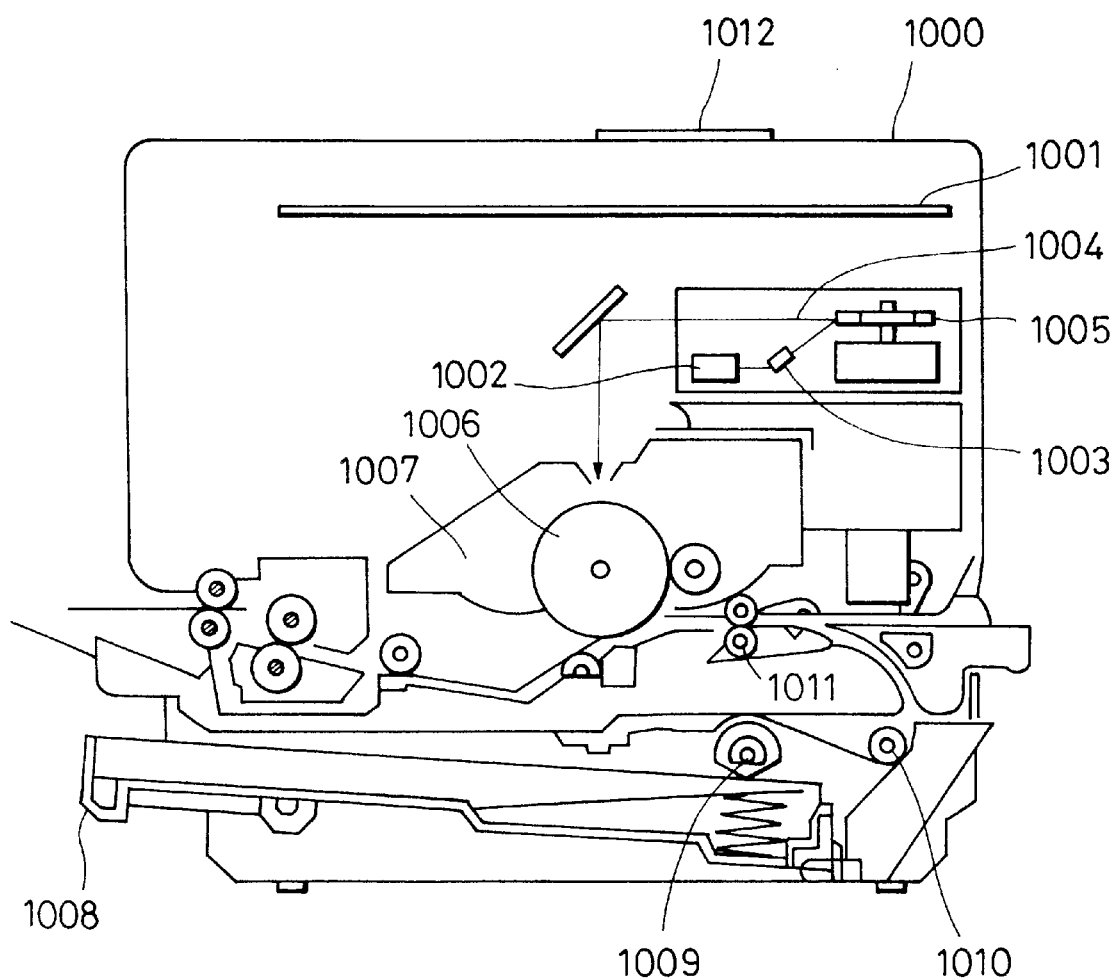
FIG. 1 is a sectional view showing the construction of an output apparatus to which the present invention can be applied.

FIG. 1 is a sectional view showing the construction of a printing apparatus to which the present invention can be applied, the printing apparatus being, by way of example, a laser beam printer (LBP).

In FIG. 1, denoted by reference numeral 1000 is an LBP body which receives and stores printing data (a printer language such as a page description language comprised of character codes, control codes, etc.), form information, macro commands, etc. that are all supplied from a host computer connected to the exterior, and creates bit map data for corresponding character patterns, form patterns and so forth in accordance with the received information, thereby forming an image on a recording medium such as a sheet of recording paper, for example. Denoted by 1012 is a control panel on which are disposed operating switches, LED indicators, etc., and 1001 is a printer control unit for controlling the entirety of the LBP body 1000 and analyzing the printing data, etc. supplied from the host computer.

As a primary task, the printer control unit 1001 converts the character information (character codes) into video signals representing the corresponding character pattern and outputs the video signals to a laser driver 1002.

The laser driver 1002 is a circuit for driving a semiconductor laser 1003 and switching on/off a laser beam 1004, emitted from the semiconductor laser 1003, in accordance with the video signals input thereto.

The laser beam 1004 is deflected to the left and right by a rotating polygonal mirror 1005 to scan over an electrostatic drum 1006 for exposure.

An electrostatic latent image of the character pattern is thereby formed on the electrostatic drum 1006. The latent image is developed by a development unit 1007 disposed around the electrostatic drum 1006, and then transferred onto recording paper. The electrostatic drum 1006 is rotated at a constant speed.

The recording paper is in the form of cut sheets which are stocked in a sheet cassette 1008 mounted in the LBP body 1000, and are taken into the body and supplied to the electrostatic drum 1006 through a paper supply roller 1009 and feed rollers 1010, 1011.

Further, the LBP body 1000 includes a card slot (not shown) for connection with an option font card including other fonts other than the built-in fonts and a control card (emulation card) including fonts based on a different printer language.

Figure 2:
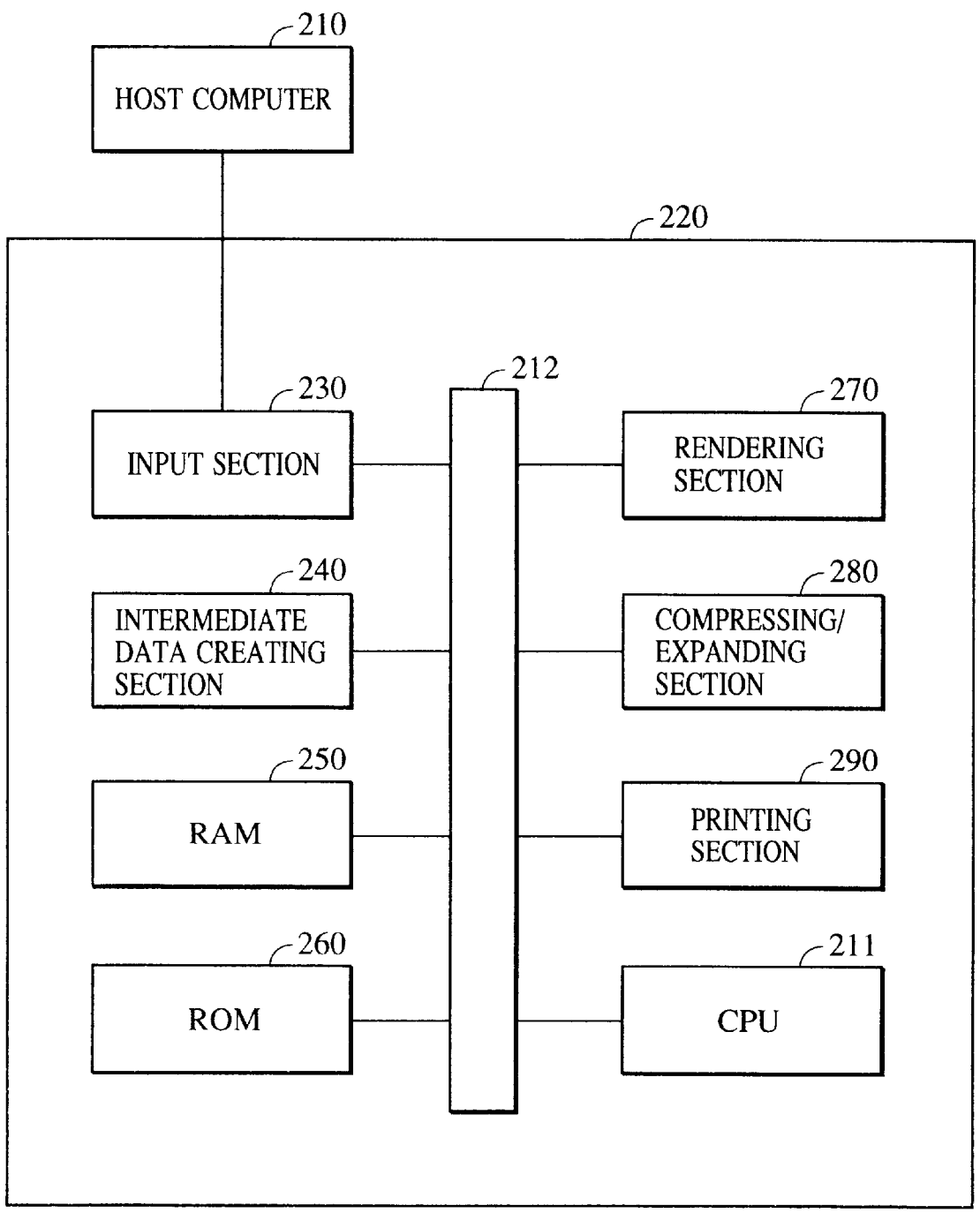
FIG. 2 is a block diagram for explaining the configuration of a printer control system in Embodiment 1 of the present invention.

FIG. 2 is a block diagram for explaining the configuration of a printer control system of the laser beam printer (FIG. 1).

It is a matter of course that the present invention is applicable to any of a single apparatus, a system made up of a plurality of apparatus, and a system in which data is processed through a network such as LAN, so long as it can execute the function to be achieved by the present invention.

In FIG. 2, a host computer 210 is connected to a printing apparatus 220 (corresponding to the LBP body 1000 in FIG. 1) through a predetermined interface (e.g., a bidirectional interface), and executes a communication process.

On the side of the printing apparatus, an input section 230 executes a communication process with respect to the host computer 210. The input section 230 executes a process of receiving printing data from the host computer 210. If necessary, the input section 230 may also execute a process of transmitting information of the printing apparatus 220 to the host computer 210.

An intermediate data creating section 240 executes a process of converting the printing data into intermediate data which has a form capable of being easily handled in the printing apparatus.

Denoted by 250 is a RAM as one example of a memory used in this embodiment. The RAM holds the intermediate data derived from the printing data received by the input section 230, a bit map resulted from rendering of the intermediate data, and a temporary buffer area necessary for processing, various processing states, etc. depending on occasions.

Denoted by 260 is a ROM for holding programs required for later-described data processing and other processes executed in the printing apparatus 220.

A rendering section 270 creates, based on the intermediate data loaded in the RAM 250, a printing image (bit map image) which is actually output for printing.

A compressing/expanding section 280 executes a process of compressing the bit map image and expanding the compressed bit map image.

A printing section 290 outputs the printing image created by the rendering section 270 and an image expanded by the compressing/expanding section 280 onto, e.g., a sheet of actual paper for printing.

Denoted by 211 is a CPU which in effect supervises the printing process and the later-described data processing executed in the printing apparatus 220 as an embodiment of the present invention.

Denoted by 212 is an internal bus for interconnecting the various sections of the printing apparatus.

2. Operation of Printing Apparatus

The processes executed by the CPU 211 in accordance with the programs stored in the ROM 260 will be explained below with reference to the drawings.

Figure 3:
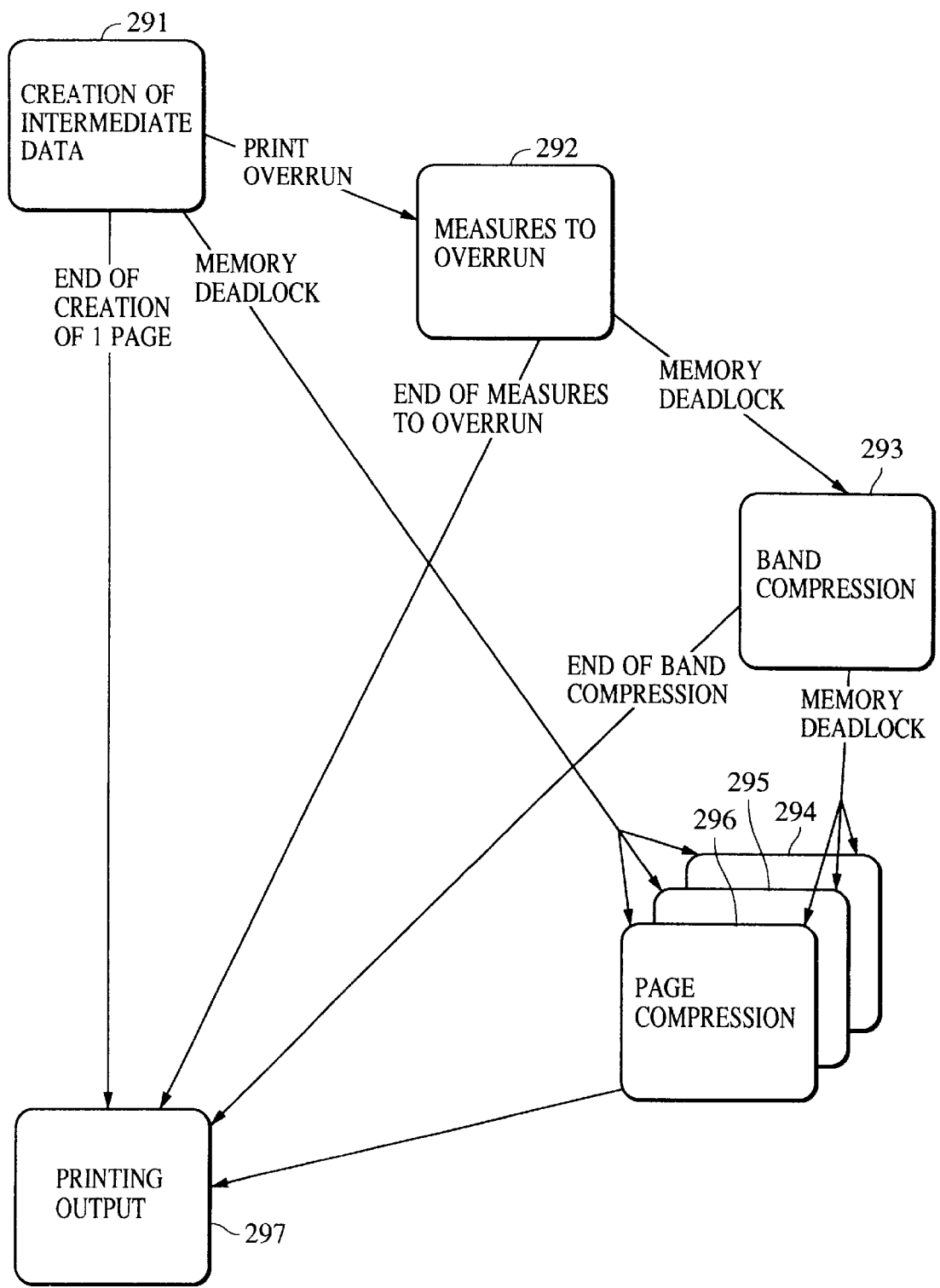
FIG. 3 is a state transition diagram for explaining state transition of internal processing of the printer control system in Embodiment 1 of the present invention.

FIG. 3 is a state transition diagram for explaining state transition of internal processing of the printing apparatus 220.

In this embodiment, the printing apparatus 220 transits among five states chiefly so that all the printing data can be output by completely avoiding print overrun and memory deadlock.

A state 291 represents a processing state where the printing data received by the input section 230 from the host computer 210 is stored in the RAM 250 in the format of intermediate data. After receiving the printing data of 1 page, if it is determined that there is no fear of print overrun, the internal processing transits to a state 297 where printing output is actually proceeded onto a sheet of paper based on the intermediate data. The process executed in the state 291 will be described later with reference to FIGS. 4 to 7, and the printing output process executed in the state 297 will be described later with reference to FIG. 24.

If the RAM for storing the intermediate data is deficient (i.e., if deadlock occurs), the internal processing transits to states 294 to 296. In the states 294 to 296, the entire page is compressed to secure a vacant area enough to avoid the deadlock. The states 294 to 296 carry out compression in different manners, and in consideration of respective features of the manners, the state 291 determines which one of the manners is to be taken for compression. This determination step will be described later in detail with reference to FIG. 18.

On the other hand, if there is a fear of print overrun as a result of checking a possibility of print overrun after the intermediate data of 1 page has been loaded in the state 291, the internal processing transits to a state 292 to perform a process of avoiding the print overrun. After the overrun avoidance process, printing output is executed in the state 297.

The manner of checking a possibility of print overrun and the process in the state 292 will be described later with reference to FIG. 8 and the subsequent figures.

In the state 292, memory deadlock may occur as a result of the overrun avoidance process. In such a case, the internal processing transits to a state 293 to perform a band compression process for avoiding the deadlock. After the completion of the band compression process, printing output is executed in the state 297. If the deadlock cannot be avoided, the internal processing transits to the band compression process in the state 294 and the subsequent states. The operation in the band compression process will be described later with reference to FIG. 10 and the subsequent figures.

3. Basic Operation

The basic operation of this printing apparatus corresponds to the transition from the state 291 to the state 297.

3-1. Explanation of Data Input Process

Figure 4:
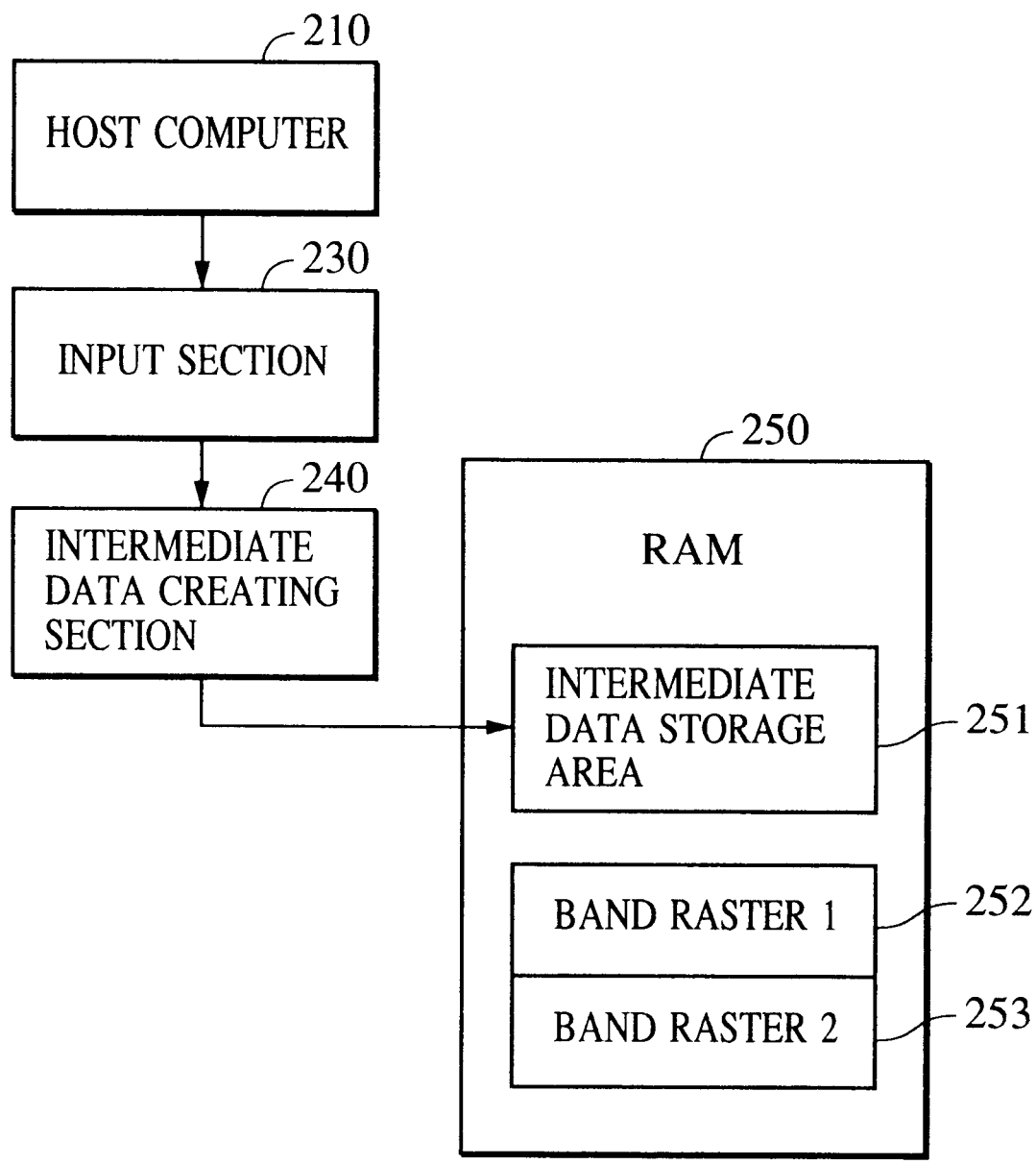
FIG. 4 is a diagram for explaining a process of receiving printing data in Embodiment 1 of the present invention.

FIG. 4 is a diagram for explaining the printing data receiving process of the printing apparatus 220 in this embodiment of the present invention.

The printing data transferred from the host computer 210 to the input section 230 over a communication line therebetween is converted in the intermediate data creating section 240 into intermediate data which is stored in an intermediate data storage area 251 within the RAM 250. The structures of the intermediate data and the intermediate data storage area 251 will be described below in detail with reference to FIG. 5.

In the RAM 250, there are also prepared two storage areas 252, 253 called a band raster 1 and a band raster 2 in addition to the intermediate data storage area 251. These areas stores an output image to be subject to printing output, which is obtained from rendering the intermediate data in the normal printing process. The band rasters 252, 253 will be described below with reference to FIG. 6.

3-2. Explanation of Intermediate Data Structure

Figure 5:
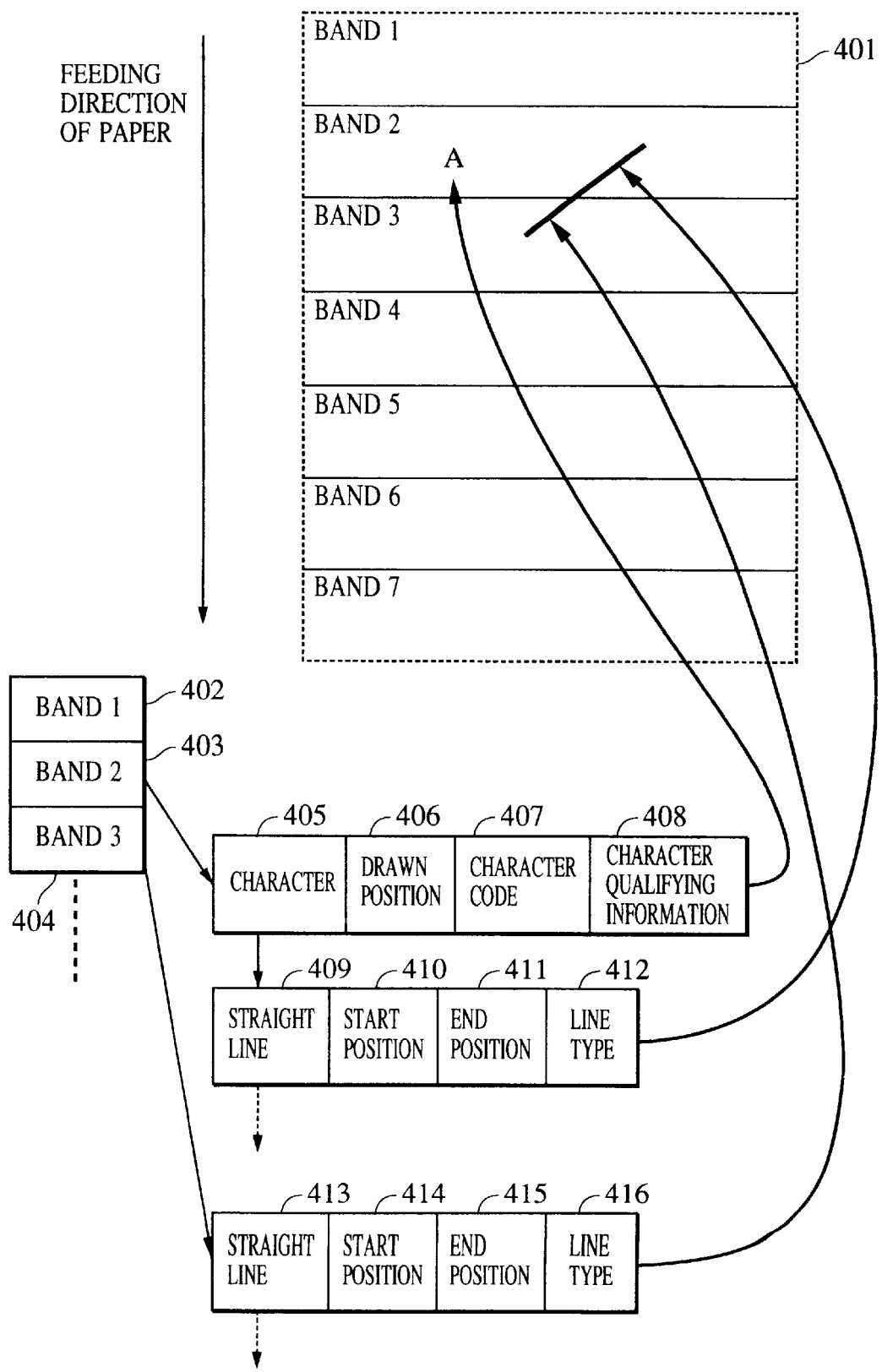
FIG. 5 is a diagram for explaining the structure and management format of intermediate data in Embodiment 1 of the present invention.

FIG. 5 is a diagram for explaining the structure and management format of intermediate data in the printing apparatus of this embodiment.

In the printing apparatus of this embodiment, one output page is divided into several small areas (bands), and rendering and printing output of successive bands are processed simultaneously in parallel. To manage the printing data in units of band for that purpose, this embodiment manages the printing data in the form of intermediate data that is easy to manage.

Denoted by 401 is a 1-page sheet of output paper which is divided into several bands called respectively band 1, band 2 and so forth. As shown, the bands are separated by boundary lines extending vertically to the feeding direction of the paper. Also, since the bands are divided so as to have the same area, the time required for forming an electrostatic latent image of one band when the printing data is output to a sheet of paper is constant.

Assuming now that the printing apparatus receives the printing data for drawing one character "A" and an oblique straight line as shown in the sheet of output paper 401, the resulting intermediate data has the structure below.

The intermediate data is first linked to intermediate data management tables 402–404. The intermediate data management tables 402–404 are prepared in the same number as the bands, and hold respective intermediate data to be drawn in the corresponding bands in a linked structure.

Now, because the character "A" is a letter to be drawn in the band 2, its intermediate data 405–408 is linked to the intermediate data management table 403. The intermediate data is structured to hold an area indicating the type of intermediate data, an area indicating the position to be drawn, other information about drawing, etc. at least as long as necessary depending on the type of intermediate data. Specifically, the intermediate data of the character "A" is made up of an item 405 indicating that the type of intermediate data is a character, an item 406 indicating the position where "A" is to be drawn, a character code 407 indicating that the character to be drawn is "A", and information 408 indicating character qualification such as bold characters, voided characters, and character color.

For a straight line to be drawn on the sheet of paper 40, as another example, because the straight line is drawn to extend over the band 2 and the band 3, two sets of intermediate data (409–412 and 413–416) are created and linked to the intermediate data management table 403 for the band 2 and the intermediate data management table 404 for the band 3, respectively.

The intermediate data thus managed is subject, when output for printing, to rendering and then printing output for each of the bands.

3-3. Explanation of Banding Process

Figure 6:
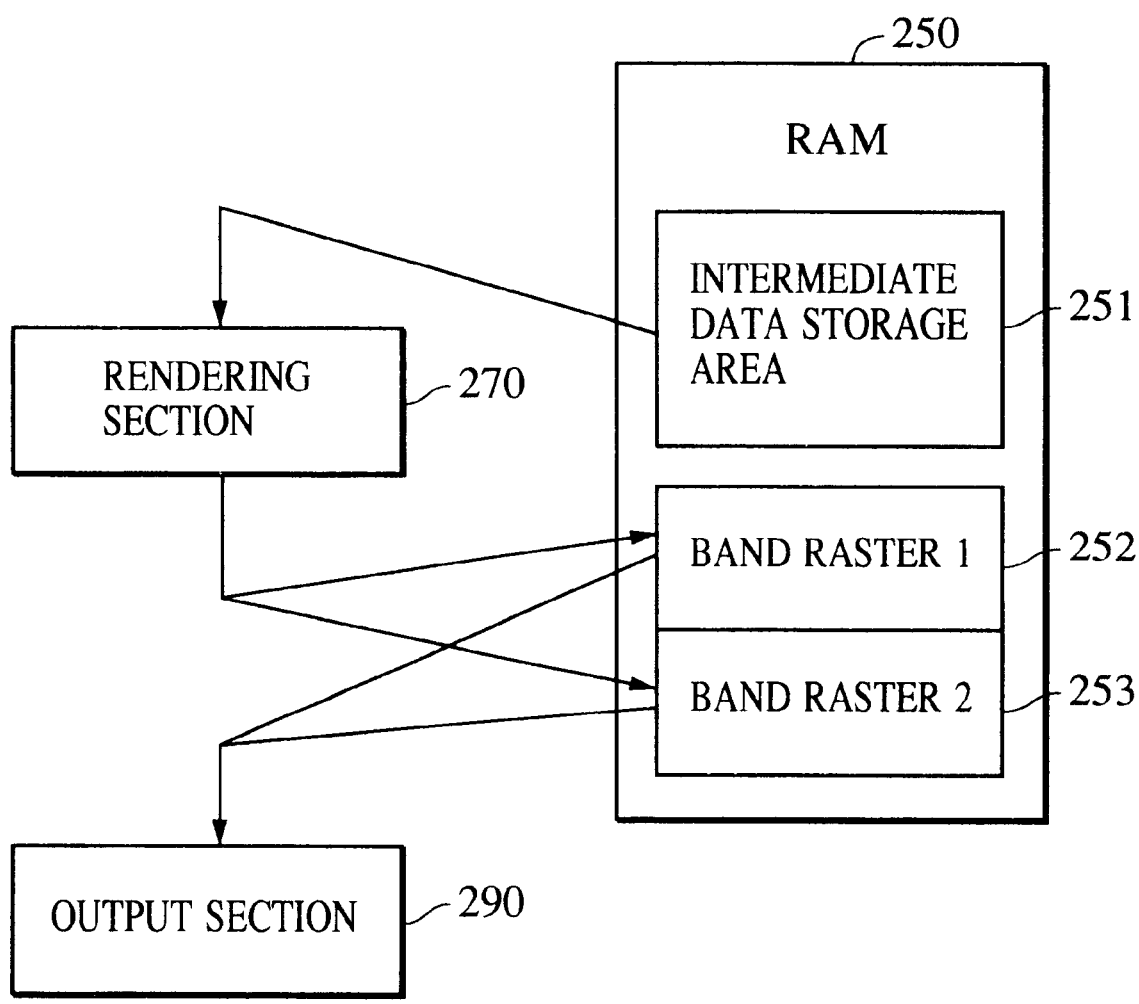
FIG. 6 is a diagram for explaining a banding process when printing data stored in intermediate data format is practically subject to printing output in Embodiment 1 of the present invention.

FIG. 6 is a diagram for explaining a banding process when printing data stored in intermediate data format is practically subject to printing output.

As stated above, the intermediate data managed and loaded in the intermediate data storage area 251 of the RAM 250 for each of the bands is subject to rendering in the rendering section 270 on the band-by-band basis. A printing image resulted from the rendering is loaded in one of the band rasters 252 and 253, followed by being transferred to the printing section 290 for printing output onto a sheet of paper.

The printing output process will be described later with reference to FIG. 25.

3-4. Explanation of Banding Timing

To which one of the band rasters 252, 253 is to be loaded the printing image will be explained with reference to FIG. 7.

Figure 7:
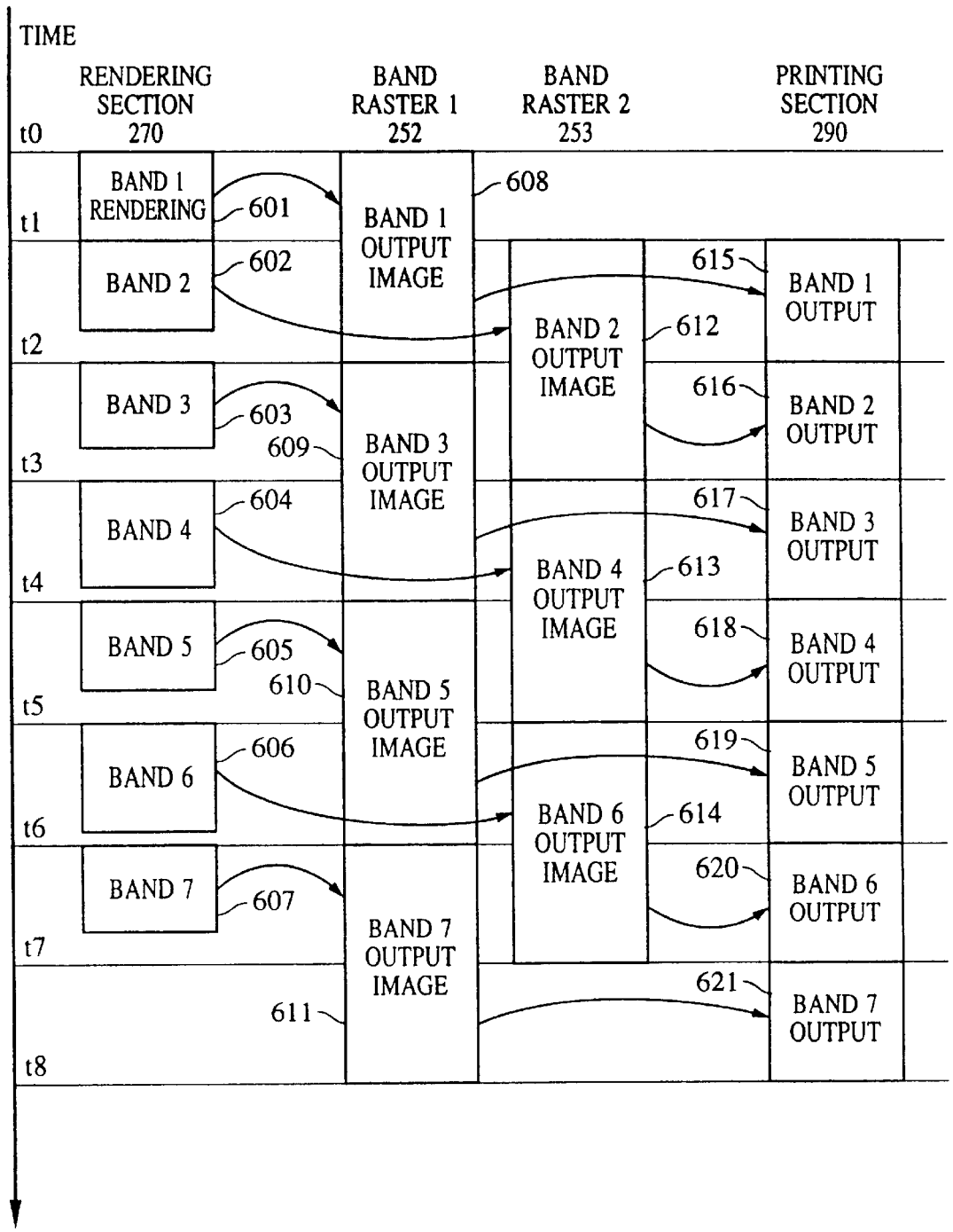
FIG. 7 is a time chart for explaining the timed relationship of a printing output process in Embodiment 1 of the present invention.

FIG. 7 is a time chart showing time-dependent changes of processing contents executed in the rendering section and the printing section, and of output images held in the band raster 1 (252) and the band raster 2 (253) with the vertical axis representing the elapse of time.

The following explanation will be proceeded along the time base in FIG. 7.

First, during a time period t0–t1, the rendering section performs rendering of the band 1 which locates at an uppermost position in the sheet of paper to be first subject to printing output (block 601). A resulting output image is loaded in the band raster 1 (252) (block 608).

Then, at time ti, the electrostatic drum 1006 is started to rotate (this step will be expressed as start of printing output hereinafter).

After the time tl, the rendering process and the printing output process are executed in parallel.

Because the area of each band is constant and the rotational speed of the electrostatic drum 1006 is constant, a printing output time (i.e., a time period t1–t2, a time period t2–t3 and so on) for each band is fixed to a constant value which is determined depending on the rotational speed of the electrostatic drum 1006.

During a time period t1–t2, a process (block 615) in which the printing section performs printing output of the printing image of the band 1 which is already loaded in the band raster 1 (252), and a process (blocks 602, 612) in which the rendering section performs rendering of the intermediate data of the band 2 loaded in the intermediate data storage area and loading an obtained printing image of the band 2 in the band raster 2 (253), are executed in parallel.

Likewise, during a time period t2–t3, the band 2 is subjected to printing output (block 616), while an output image of the band 3 is developed in the band raster 1 (252) (blocks 603, 609).

After that, similar processes are repeated (blocks 604–607, 610, 611, 613, 614, 617–620). Finally, during a time period t7–t8, printing output of the band 7 is performed (block 621), thereby completing the printing of one page.

The above-stated processing method requires band rasters for only two bands, and therefore the printing output process can be performed with memory capacity much less than the memory size necessary for storing an output image of full one page. It is needless to say that the number of band rasters is not limited to two, but may be three or more.

Although the printing output time for each band is fixed to a constant value depending on the rotational speed of the electrostatic drum 1006 as stated above, a time required for rendering each band varies depending on the intermediate data. Accordingly, if the intermediate data of one band takes a very long time for rendering, the rendering time of such a band becomes longer than the printing output time of another band under processing in parallel, causing a failure in the printing output process (i.e., print overrun).

In the present invention, therefore, the above trouble is avoided as follows.

4. Measures to Overrun

If a band requiring measures to overrun exists in the state 291 in FIG. 3, the internal processing transits to the state 292. The operation performed in this case will be explained below.

4-1. Explanation of Pre-Rendering Process

Figure 8A:
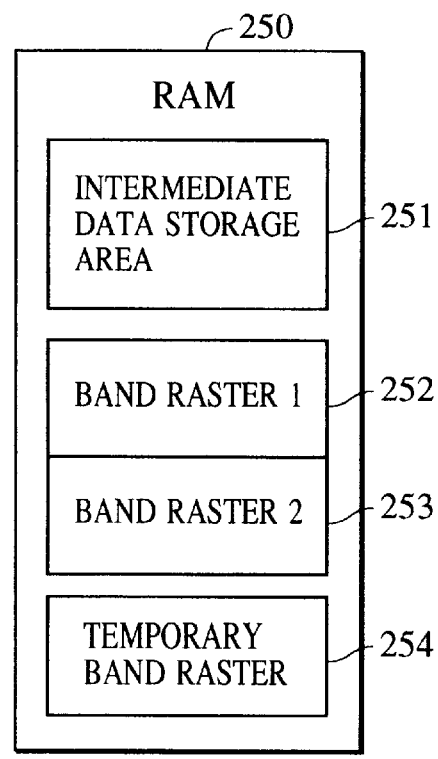
FIGS. 8A and 8B are diagrams for explaining a process of avoiding print overrun in Embodiment 1 of the present invention.
Figure 8B:
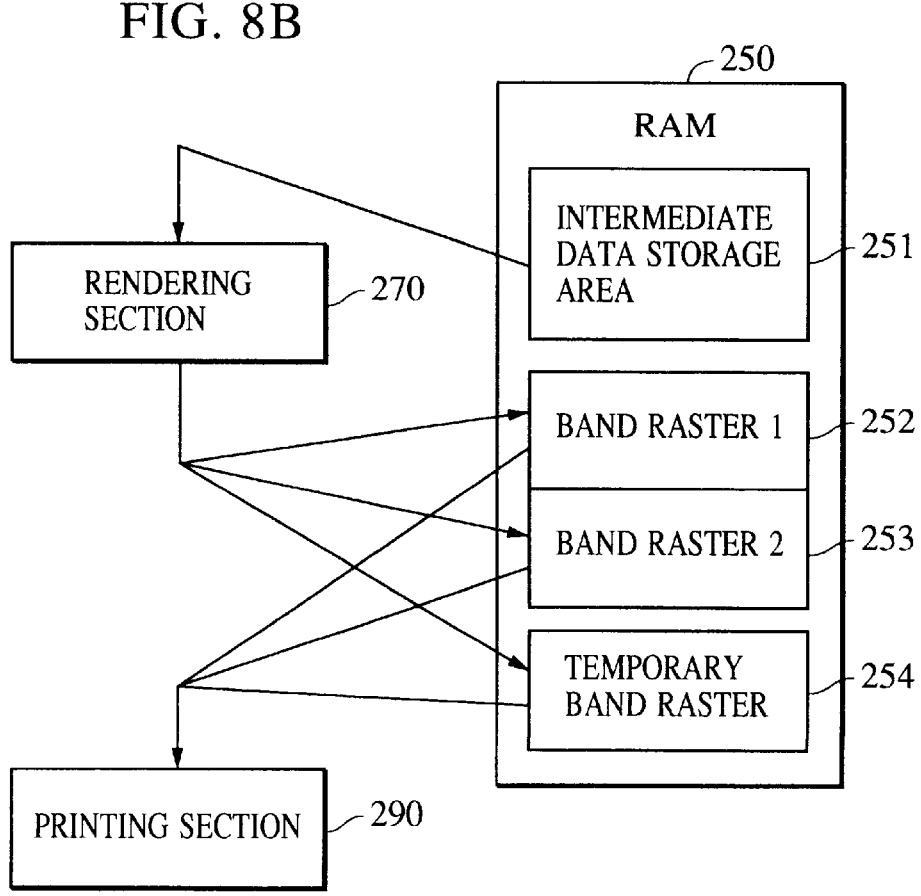

FIGS. 8A and 8B are diagrams for explaining a process of avoiding print overrun. Let now consider, by way of example, the case where the rendering time of the band 4 exceeds the band output processing time.

FIG. 8A shows a memory map after the intermediate data of 1 page has been loaded in the intermediate data storage area.

At this point in time, bands for which print overrun will occur are estimated, and temporary band rasters are reserved in number corresponding to those bands. Since only the band 4 is estimated to undergo overrun in this example, one temporary band raster 254 is reserved. A method of estimating which one of bands undergoes overrun will be described later in detail with reference to FIGS. 15 and 19.

The process of taking the measures to overrun will be described later with reference to FIG. 22.

Then, as shown in FIG. 8B, rendering is performed in an appropriate manner by using the band raster 252, the band raster 253 and the temporary band raster 254, and printing output is also performed from these band rasters, thereby avoiding the print overrun.

Those processes will be described later in detail with reference to FIG. 24.

The timed relationship between rendering and printing output for each of bands and the usage of the band rasters will be explained below with reference to FIG. 9.

4-2. Explanation of Pre-Rendering Timing

FIG. 9 is a time chart for explaining the timed relationship between rendering and printing output using the temporary band raster in the process of avoiding the print overrun.

In this process, unlike the timed relationship explained above with reference to FIG. 7, two bands are subject to rendering before the start of printing output.

First, during a time period t0–t1, rendering is performed on the intermediate data of the band 4 which has been estimated to undergo print overrun (block 801), and a resulting output image is loaded in the temporary band raster 254 (block 814).

Then, during a time period t1–t2, rendering is performed on the band 1 which is to be first subject to printing output (block 802), and a resulting output image is loaded in the band raster 1 (252) (block 808), as with the above normal case.

Subsequently, printing output is started at time t2.

After the time t2, the subsequent bands are subject to rendering (blocks 803–807, 809–813) and printing output (blocks 815–817, 819–821) in parallel with the same timed relationship as explained above in connection with FIG. 7.

No rendering is performed in a time period t4–t5 in which the band 4 is subject to rendering in FIG. 7. In a time period t5–t6 scheduled for printing output of the band 4, the output image of the band 4 having been already subject to rendering and loaded in the temporary band raster is output for printing (block 818).

Thus, by preparing the temporary band raster and changing the timing of rendering, it is possible to avoid print overrun.

For the case where many bands are estimated to undergo print overrun, or for low-price models where the RAM capacity of printing apparatus is small, however, temporary band rasters necessary for loading those bands may not be secured because of deficiency of the memory capacity.

5. Band Compression

In this embodiment, the internal processing transits 4. from the state 292 to the state 293 in FIG. 3 under the above situations, thereby avoiding memory deadlock. The operation performed in this case will be explained below.

5-1. Explanation of Pre-Rendering Compression Process

Figure 10A:
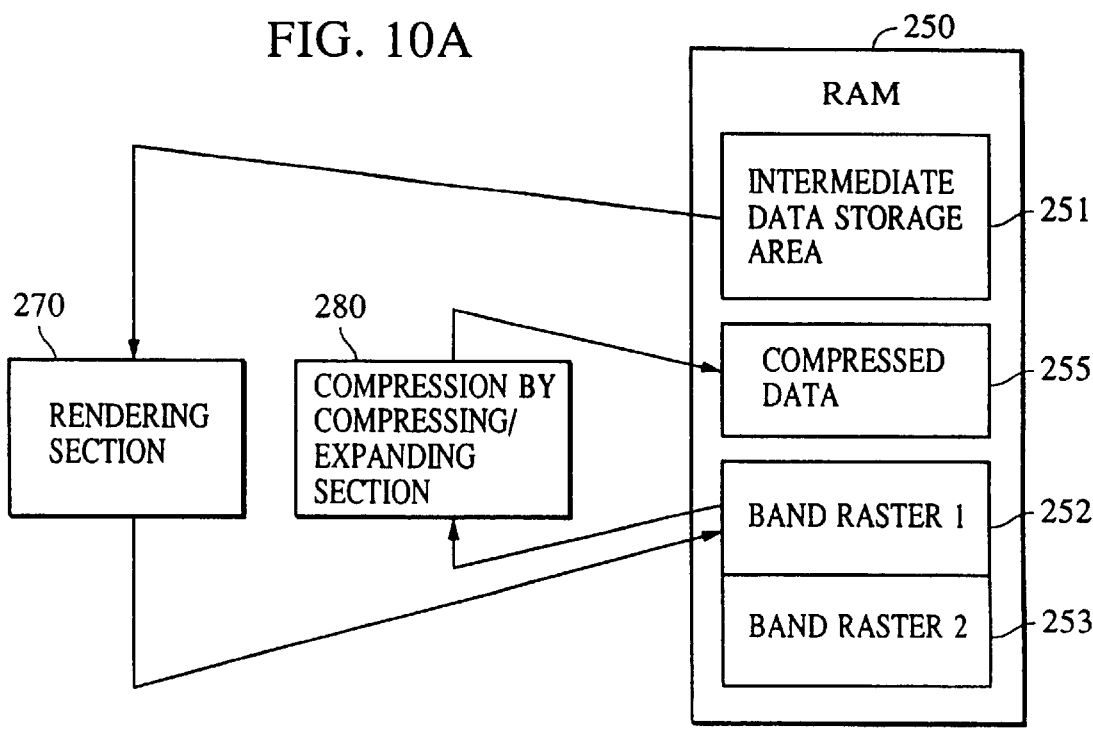
FIGS. 10A and 10B are diagrams for explaining band compression in Embodiment 1 of the present invention.
Figure 10B:
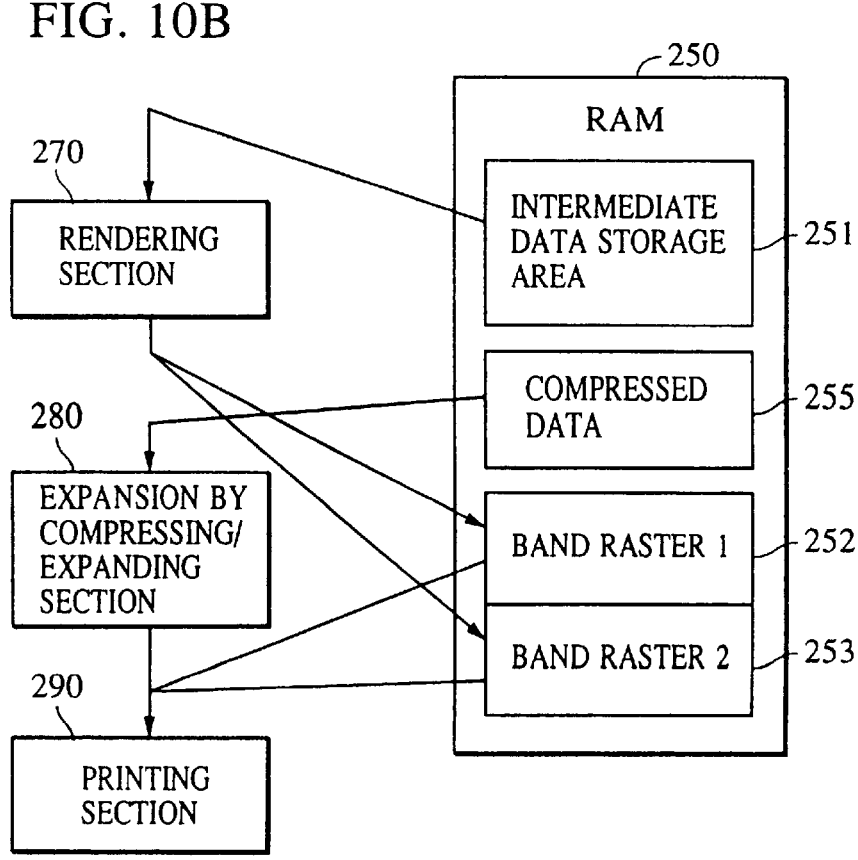

FIGS. 10A and 10B are diagrams showing a process executed when temporary band rasters are not secured because of deficiency of the memory capacity.

FIG. 10A shows a process to be performed before the start of printing output.

When sufficient temporary band rasters cannot be secured, the band which has been estimated to undergo print overrun is subject to rendering and a resulting output image is loaded in one of the band rasters 252, 253.

The output image is then compressed with the compression function of the compressing/expanding section 280 into compressed data 255 which is loaded in the RAM 250 (this step will be referred to as a band compression process hereinafter).

Because the size of the compressed data 255 becomes smaller as a result of compression than the size of output image data previously loaded in the band raster in the normal form, a probability that the print overrun cannot be avoided because of deficiency of the capacity of the RAM is reduced.

The band compression process will be described later with reference to FIG. 23.

In the printing output process, as shown in FIG. 10B, normal bands are subject to rendering and printing output by using two band rasters, while the band loaded in the form of compressed data is output for printing while it is expanded with the expansion function of the compressing/-expanding section 280.

The printing output process in this case will be described later with reference to FIG. 24.

5-2. Explanation of Pre-Rendering Compression Timing

Figure 11:
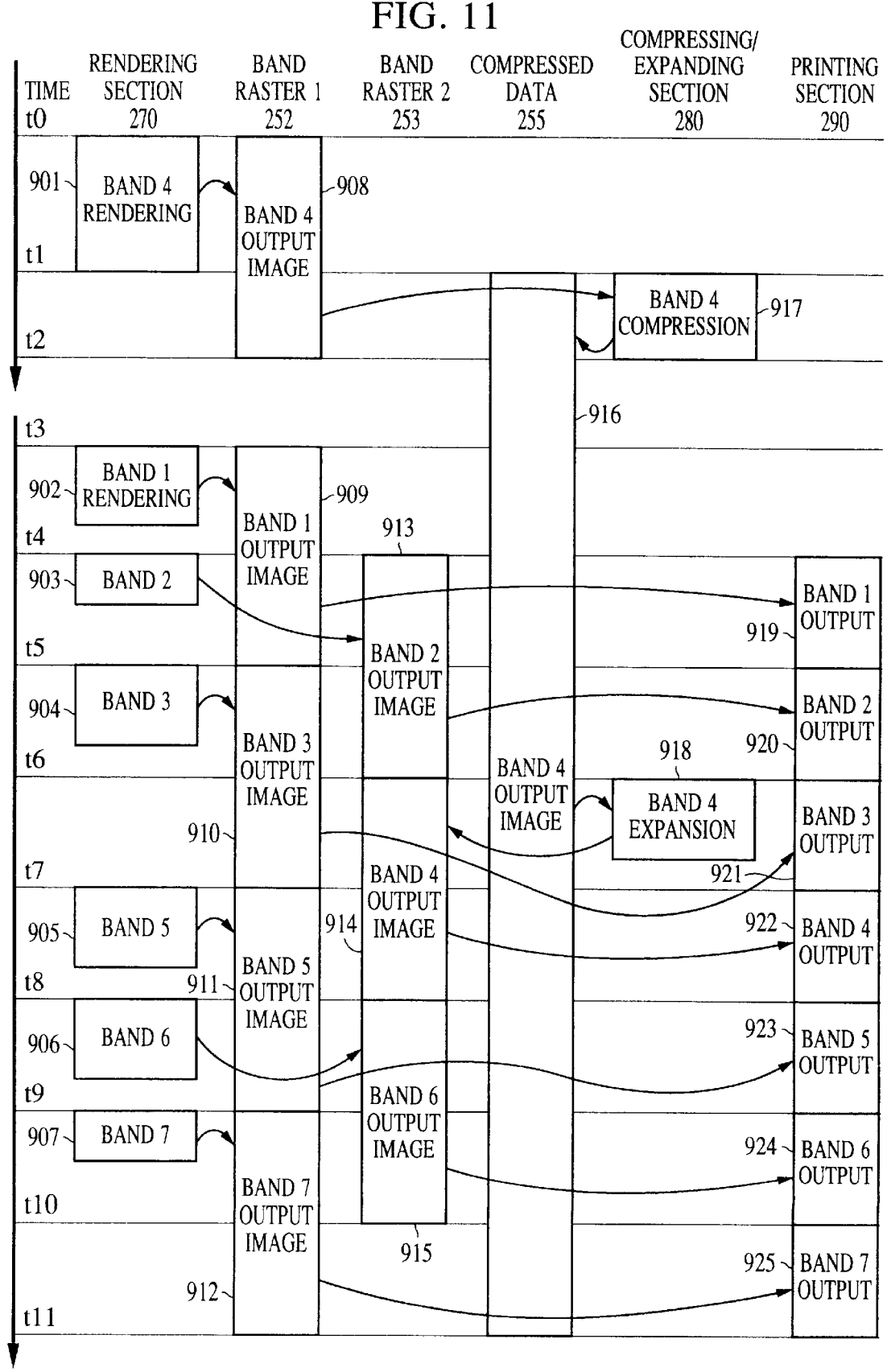
FIG. 11 is a time chart for explaining the timed relationship between rendering and printing output performed based on a band compression process in Embodiment 1 of the present invention.

The timed relationship between rendering and printing output performed in accordance with the processing method shown in FIGS. 10A and 10B will now be explained with reference to a time chart of FIG. 11. In FIG. 11, it is assumed, by way of example, that the band 4 is estimated to undergo print overrun.

First, during a time period t0–t2 before the start of printing output, the band 4 having been estimated to undergo print overrun is subject to rendering and a resulting output image is loaded in the band raster 1 (252) (blocks 901, 908). The output image is then compressed (block 917) with the compression function of the compressing/expanding section 280 into compressed data which is loaded in the RAM 250 (block 916).

After that, with the same timed relationship as explained above in connection with FIG. 7, the head band 1 is subject to rendering (blocks 902, 909) and printing output is started in a time period t3–t4.

Other bands than that having been estimated to undergo print overrun are subject to rendering (blocks 903–907, 909–913, 915) and printing output (blocks 919–925) in parallel. For the band 4 having been estimated to undergo print overrun, the output image is loaded in the band raster 2 (253) after expansion of the compressed data (blocks 918, 914).

As a result of the above process, a probability that the print overrun cannot be avoided by the method of securing the temporary band raster, as explained above in connection with FIGS. 8A and 8B, is reduced.

But, unless a processing time required for expanding the band (i.e., a time period t6–t7) is shorter than the processing time for printing output, there occurs print overrun owing to the expansion process. Therefore, the compressing/expanding section 280 must select a method capable of expanding the compressed data at such a speed that the expansion process does not occur print overrun because of a prolonged processing time. It is generally required to employ a compression method having a high expansion speed, or speed up the expansion process by using hardware.

Even the foregoing method cannot completely avoid the print overrun. If many bands are estimated to undergo print overrun, or if a compression rate of the compressed data is poor, the memory capacity secured in the RAM for storing the compressed data may become deficient. In this embodiment, the internal processing transits from the state 293 to the states 294–296 in FIG. 3 under such situations.

The above description has been made on an assumption that the intermediate data of 1 page can be stored in the RAM. In the case of the intermediate data having a very large size, however, it may happen that the intermediate data cannot be all stored in the state 291 and the printing process is disabled. If such an event occurs, the internal processing transits from the state 291 to the states 294–296 in this embodiment.

Those situations giving rise to deficiency of the RAM capacity are overcome through a page compression process below in the present invention.

6. Page Compression 6-1. Explanation of Page Compression Process

Figure 12A:
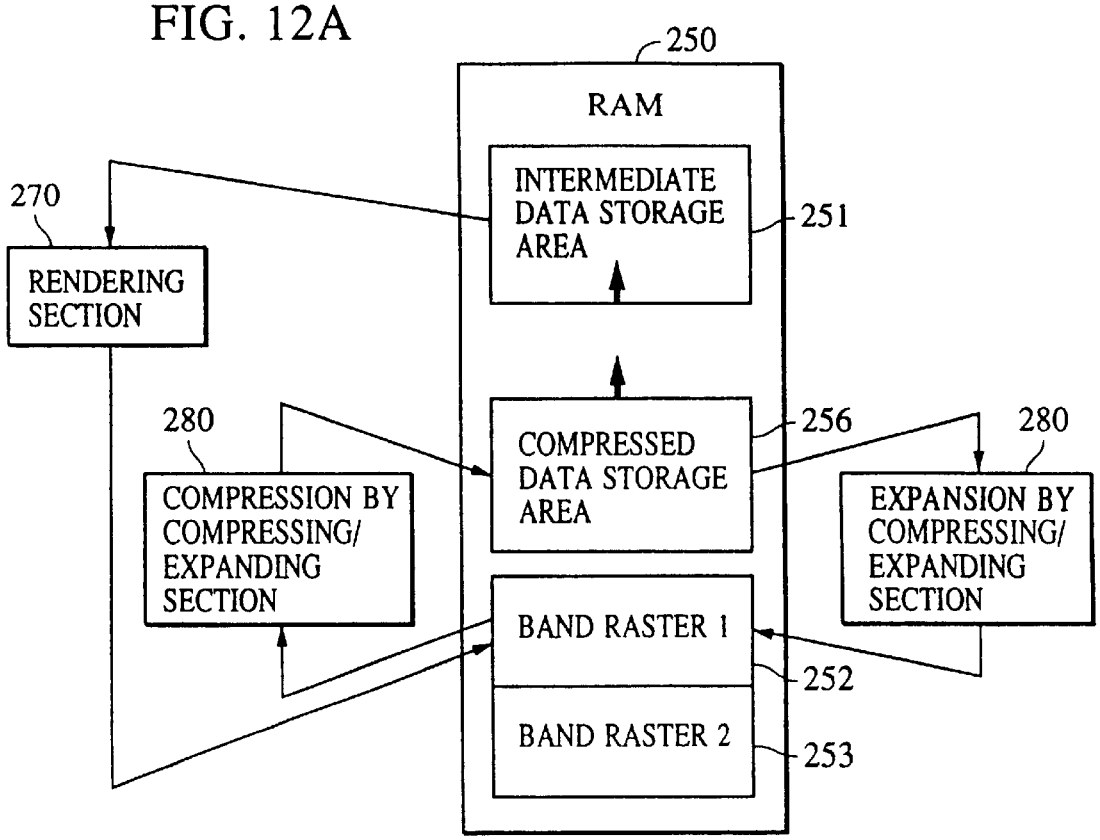
FIGS. 12A and 12B are diagrams for explaining page compression in Embodiment 1 of the present invention.
Figure 12B:
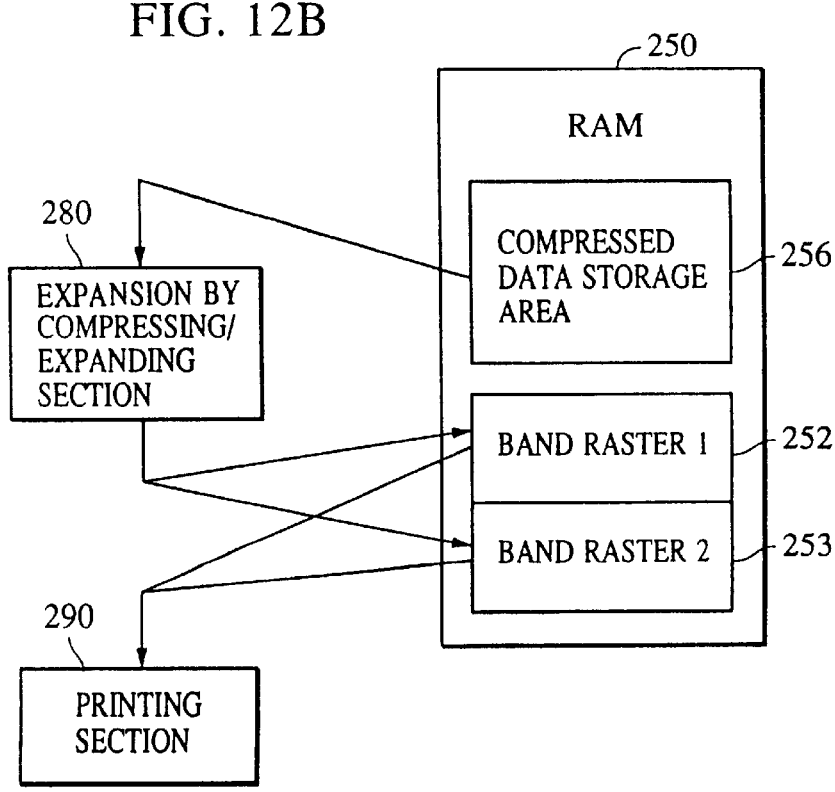

FIGS. 12A and 12B are diagrams for explaining a process to be executed when the intermediate data cannot be all loaded because of deficiency of the RAM capacity, or a temporary band raster cannot be secured or compressed data cannot be loaded even with the pre-rendering avoidance process.

FIG. 12A shows a process to be executed in the case of deficiency of the RAM capacity.

When the RAM capacity is deficient, the intermediate data of each of all the bands is subject to rendering, a resulting output image is loaded in the band raster 252 (253), and the output image is then converted with the compression function of the compressing/expanding section 280 into compressed data which is loaded in a compressed data storage area 256 (this step will be referred to as a page compression process hereinafter). As shown in FIG. 12A, both the compressed data storage area 256 and the intermediate data storage area 251 located on the same RAM 250, and the size of the intermediate data storage area 251 is finally reduced to zero by erasing the intermediate data of the band after being compressed.

When the capacity of the RAM 250 has become deficient because of the intermediate data being too large, the intermediate data storage area 251 is formed again in the RAM 250, in which a vacant area has been produced as a result of the compression process, for management of the intermediate data for subsequent bands. Then, when the capacity of the RAM 250 has become deficient again, or when the printing data of 1 page has been completely received, the intermediate data of the relevant band or each of other bands is also compressed in a like manner. In this case, before rendering the intermediate data of the band into band raster 252, the compressed data of the same band is expanded with the expansion function of the compressing/expanding section 280, followed by rendering on the resulting data.

Further, when the capacity of the RAM 250 becomes deficient even after compressing all the bands, all the bands are compressed again by a compression method having an even higher compression rate.

The above page compression process will be described later in detail with reference to FIG. 24.

6-2. Explanation of Compressed Data Structure

Figure 13:
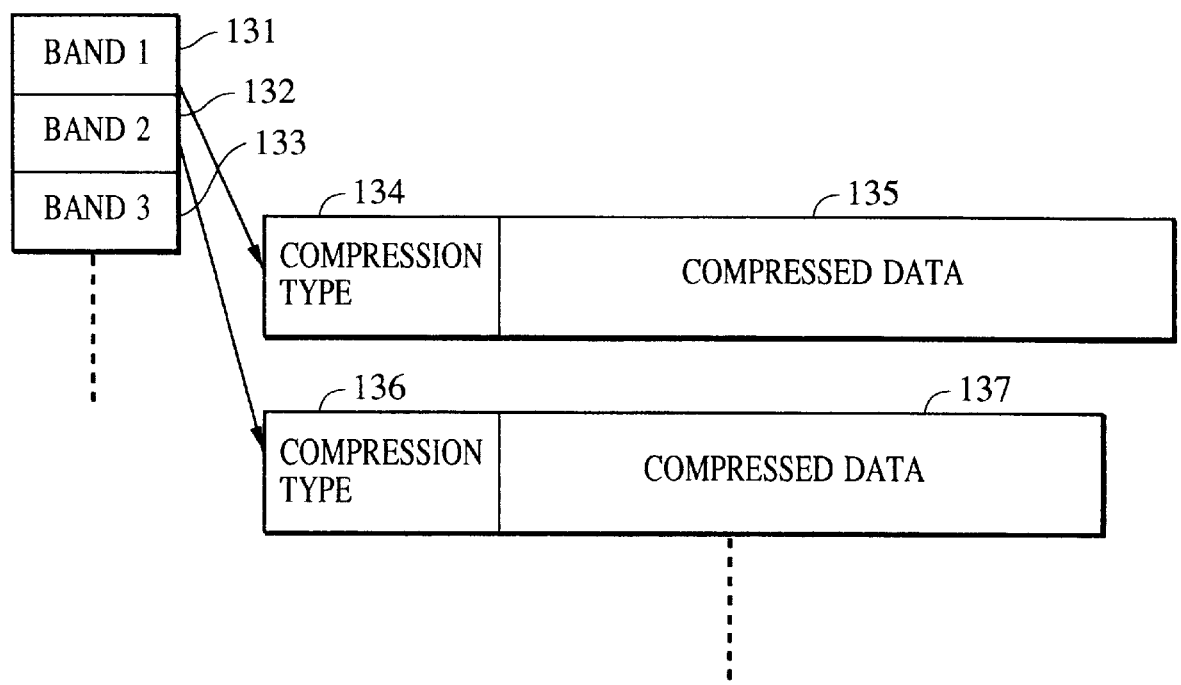
FIG. 13 is a diagram for explaining a compressed data management structure when the page compression is performed in Embodiment 1 of the present invention.

Through the foregoing process, all the intermediate data is converted into compressed data. A method of managing the compressed data storage area 256 in that case will now be described with reference to FIG. 13.

All sets of compressed data exist in one-to-one relation to the bands. As with the intermediate data, the compressed data is managed by compressed data management tables 131–133.

One set of compressed data for each band is made up of a compression type 134 (136) indicating which one of plural compression types was used for compressing the data, and a compressed image 135 (137) obtained by compressing an actual output image.

6-3. Explanation of Page Compression Timing

Figure 14:
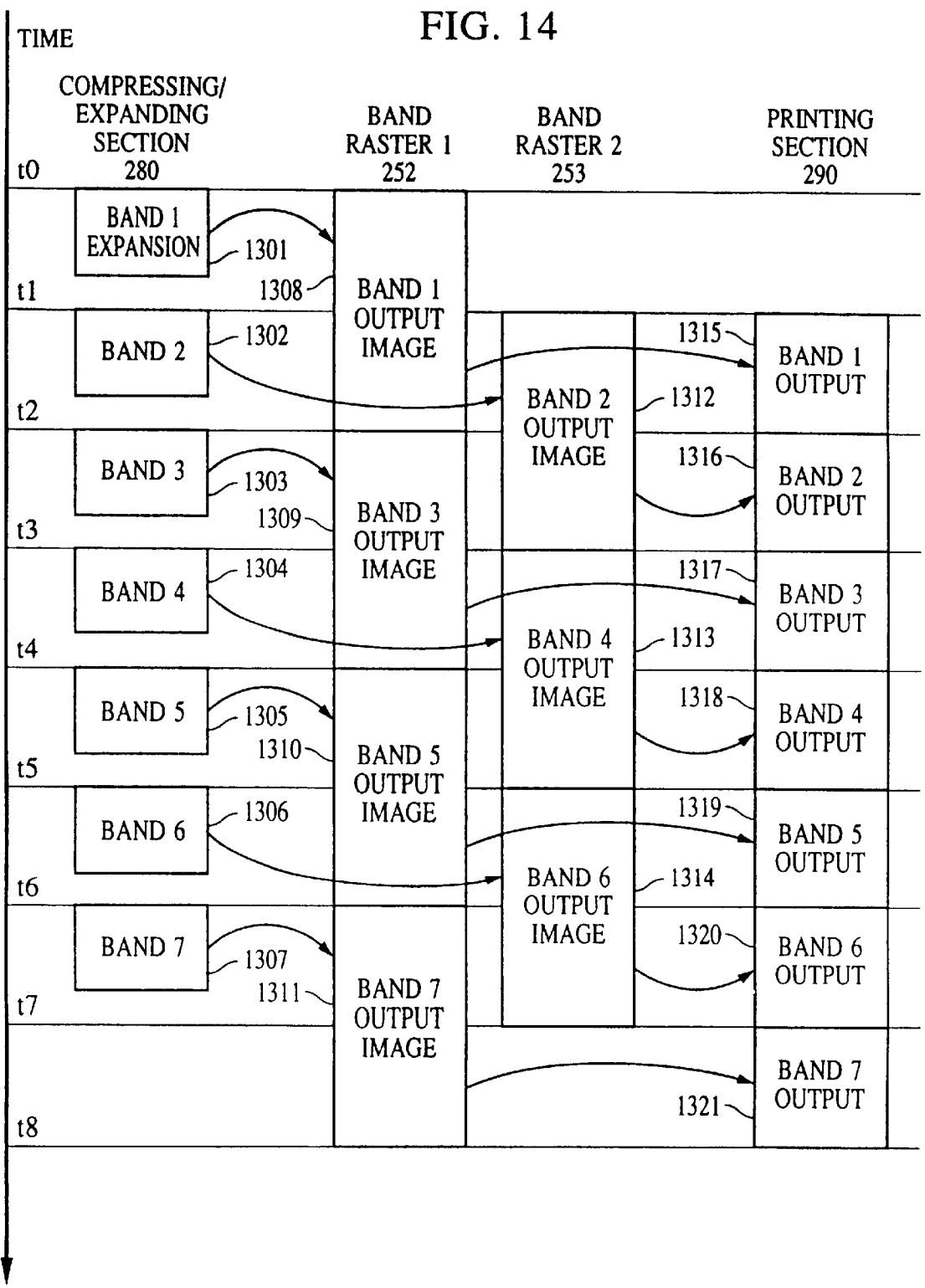
FIG. 14 is a time chart for explaining the timed relationship of the printing output process when the page compression is performed in Embodiment 1 of the present invention.

The time relationship in the printing output process executed in the case of the page compression process will be explained below with reference to FIG. 14.

In the case of the page compression process, the printing output process is executed with substantially the same timed relationship as explained above in connection with FIG. 7.

During a time period t0–t1, the compressing/-expanding section 280 first expands the compressed data 1301 of the band 1 into the band raster 1 (252) (blocks 1301, 1308), and printing output is then started. After that, expansion of the compressed data (blocks 1302–1307, 1309–1314) and printing output (blocks 1315–1321) are processed in parallel. Processing of 1 page is ended by completing the printing output of the band 7.

As explained above in connection with FIG. 11, an appropriate expansion type or expansion circuit is used so that the time required for the expansion process of each band is shorter than the time required for the printing output of each band.

Through the foregoing processes, all the printing data can be processed without undergoing memory deadlock and print overrun.

7. Explanation of Procedure of Printing One Page

Figure 15:
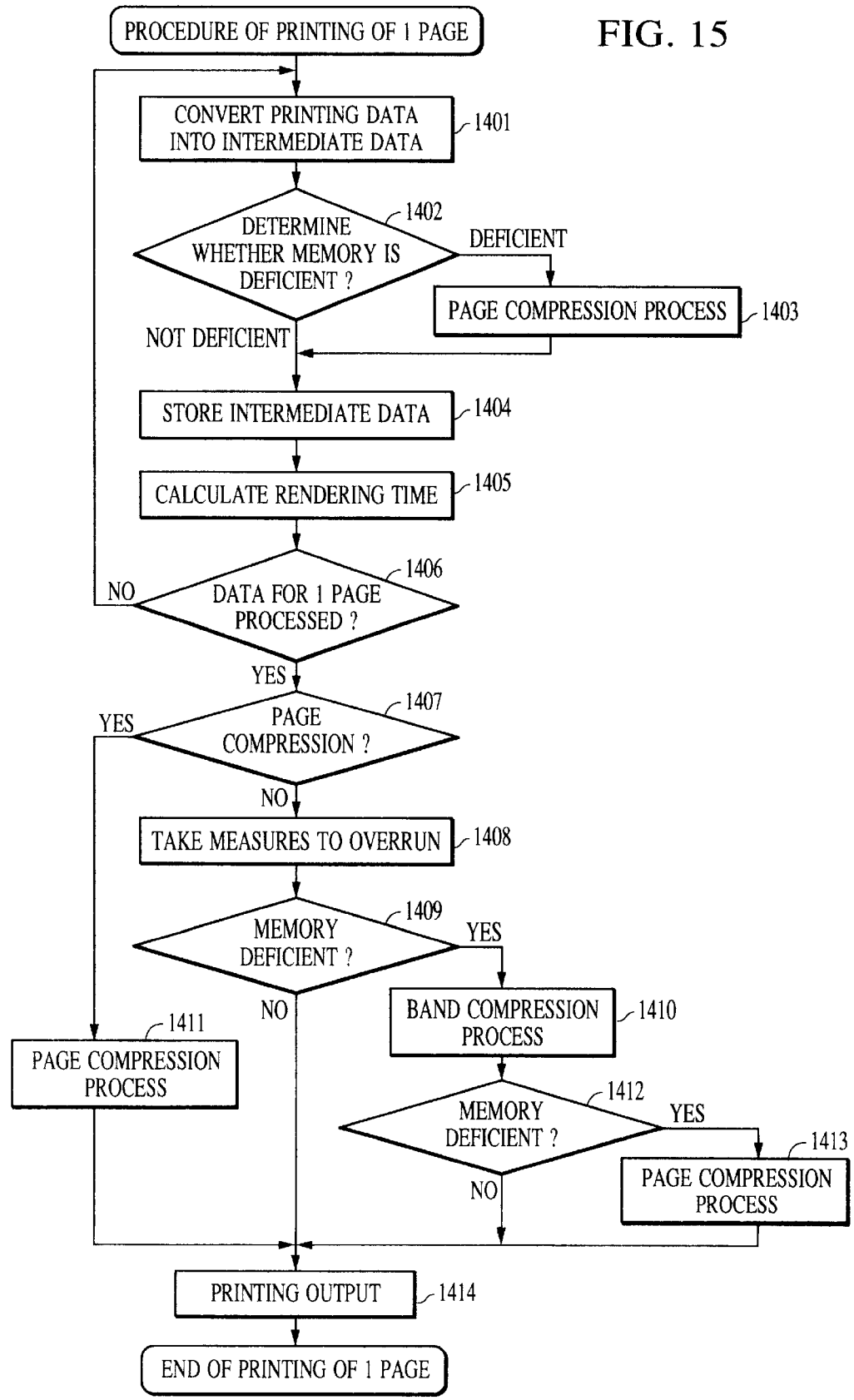
FIG. 15 is a flowchart showing the procedure of printing one page in Embodiment 1 of the present invention.

FIG. 15 is a flowchart showing the above-explained operation of this embodiment as a procedure from reception of printing data of 1 page to printing output thereof.

In step 1401, printing data transferred from the host computer 210 and received by the input section 230 is converted into intermediate data by the intermediate data creating section 240.

The format of the intermediate data may be any desired one suitable for the internal processing intended; e.g., a format enabling the intermediate data to be easily processed in the rendering section 270, or a format being effective to reduce the size of the intermediate data, or a format enabling the intermediate data to be processed at a higher speed.

(Checking of Shift to All Bands Compression)

Next, in step 1402, it is determined whether the memory is deficient or not for loading the converted intermediate data in the RAM 250. Whether the memory is deficient or not is determined in consideration of not only whether an actual vacant memory size is sufficient, but also whether the page compression process explained below can be executed. This determination also includes a decision as to which one of plural compression processes should be executed.

A method of making the above determinations will be described later in detail with reference to FIG. 18.

(Shift to All Bands Compression)

If the memory is determined to be deficient in step 1402, then the control flow goes to step 1403 where all the intermediate data created so far is subject to rendering while omitting the intermediate data, and bit map images resulted from the rendering are compressed by the designated compression type into compressed data which is loaded in the RAM 250 again. With this step 1402, a vacant memory area is secured in size enough to load the intermediate data to be processed in the RAM 250.

Executing the above step guarantees that there will not occur memory deadlock when the intermediate data is created.

The above full-page compression process will be described later in detail with reference to FIG. 16.

After that, in step 1404, the intermediate data under processing is actually loaded in the RAM 250.

(Calculation for Pre-Rendering)

Next, in step 1405, calculation for the process of avoiding print overrun is executed.

Specifically, in step 1405, a time required for the rendering process of the intermediate data loaded in step 1404 is calculated for each band and collected for all the bands. The rendering time is thus measured in units of band.

If the full-page compression process of step 1403 is executed even once for avoiding memory deadlock, a time required for the expansion process of the compressed data is calculated as the rendering time per band.

As an alternative method, when the page compression process of step 1403 has been already performed, the relevant page may be processed by eventually rendering all intermediate objects and holding all the bands in the format of compressed data. In this case, it can be said that the processing time determined in step 1405 in units of band is a time required for expanding the compressed data in units of band.

This embodiment takes the latter method and employs a compression/expansion process of the type capable of executing the expansion process at a sufficiently high speed. This nullifies a possibility that there occurs print overrun owing to the expansion process. Also, the calculation of the rendering time in step 1405 is no longer needed for the page which has been already subject to the page compression process of step 1403.

The calculation of the rendering time will be described later in detail with reference to FIG. 19.

Next, in step 1406, it is determined whether the printing data of 1 page has been processed or not. If the page is not yet completely processed, then the above-stated process from step 1401 is repeated for the next printing data.

(Processing after All Bands Compression)

After the printing data of 1 page has been processed, it is checked in step 1407 whether the page has been subject even once to the page compression process (step 1403). If so, then the control flow goes to step 1411 for holding all the printing data in the form of compressed data as mentioned above.

In step 1411, all the intermediate data created after execution of the last page compression process (step 1403) is subject to rendering and compression process. This process is the same as the page compression process executed in step 1403, and will be described later with reference to FIG. 16.

Eventually, the printing data is held in the RAM 250 in the format of compressed data for all the bands. The control flow then goes to the printing output process in step 1414.

(Pre-Rendering Process)

On the other hand, if it is determined in step 1407 that the page compression process has not been executed so far even once, then the print-overrun avoidance process is executed in step 1408.

When the rendering time for each band calculated in step 1405 exceeds a threshold, the print-overrun avoidance process is executed by rendering the relevant band before the start of printing output.

The threshold is determined from the following formula based on the paper feeding speed in the printing process and the band size:

$$\text{threshold}=\text{paper feeding speed}\times\text{band height}\div\text{paper sheet height}-\text{overhead}$$

where threshold value: time for feeding a 1-page sheet of paper determined depending on characteristics of the printing engine, paper sheet height: length of a sheet of printing paper in the feeding direction of the paper band height: length of each band in the feeding direction of the paper overhead: factors associated with the rendering process of one band except the rendering time While the threshold is determined from the above calculation in this embodiment, it may be determined from a different formula, e.g.,:

$$\text{threshold}=\text{paper feeding speed}\times\text{band height}\div\text{paper sheet height}-\text{overhead}+(\text{threshold of previous band}-\text{rendering time of previous band})$$

Here, it can be said that when the previous band has been subject to the measures to print overrun, the rendering time of the previous band is zero.

As another method, the threshold may be determined as a time period from the time at which the last rendering was ended, to the time at which rendering of the relevant band has to be started. In this case, the time at which the last rendering was ended means the time of the end of rendering for the last band which is not yet subject to the measures-to-overrun process and locates ahead of the band under processing.

In step 1408, when the rendering time per band exceeds the threshold, a temporary band raster memory for holding the bit map resulted from rendering the relevant band is reserved.

When one or more necessary temporary band raster memories are reserved, printing output of the full-page can be performed without undergoing print overrun by loading the intermediate data for all the bands, which have been determined to undergo print overrun, in the respective temporary band raster memories prior to the start of printing output. This measures-to-overrun process will be described later in detail with reference to FIG. 22.

Subsequently, if it is determined in step 1409 that there is a vacant area in the capacity of the RAM 250 enough to secure the temporary band raster memories necessary for carrying out the measures to print overrun performed for all the relevant bands in the process of step 1408, then the bands undergoing print overrun are all subject to rendering and thereafter printing output is actually performed onto a sheet of paper in step 1414. This printing output process will be described later in detail with reference to FIG. 24.

(Pre-Rendering Compression Process)

If it is determined in step 1409 that the temporary band raster memories for the measures to print overrun cannot be secured, then the bands undergoing overrun are subject to rendering in step 1410, and resulting bit map images are compressed and held in the RAM 250 in the format of compressed data.

Because the expansion speed of the compressed data is sufficiently higher than the paper feeding speed in this embodiment, as mentioned above, any compressed band does not undergo print overrun.

In step 1412, it is determined whether all the bands undergoing print overrun can be held in the RAM 250. If the memory is not deficient, then the control flow goes to step 1414 for carrying out the printing output process.

If all the print-overrun bands cannot be held in the RAM 250 even after being compressed, then the page compression process is executed in step 1413 on all the bands including those bands not undergoing print overrun in a like manner as in steps 1403 and 1411. This page compression process will be described later with reference to FIG. 16.

After the printing data of 1 page has been thus held in the RAM 250 in the format of intermediate data or compressed data with a guarantee that all the bands will not undergo print overrun, printing output is actually performed onto a sheet of paper in step 1414. This process will be described later with reference to FIG. 24.

8. Explanation of All Bands (Page) Compression

Figure 16:
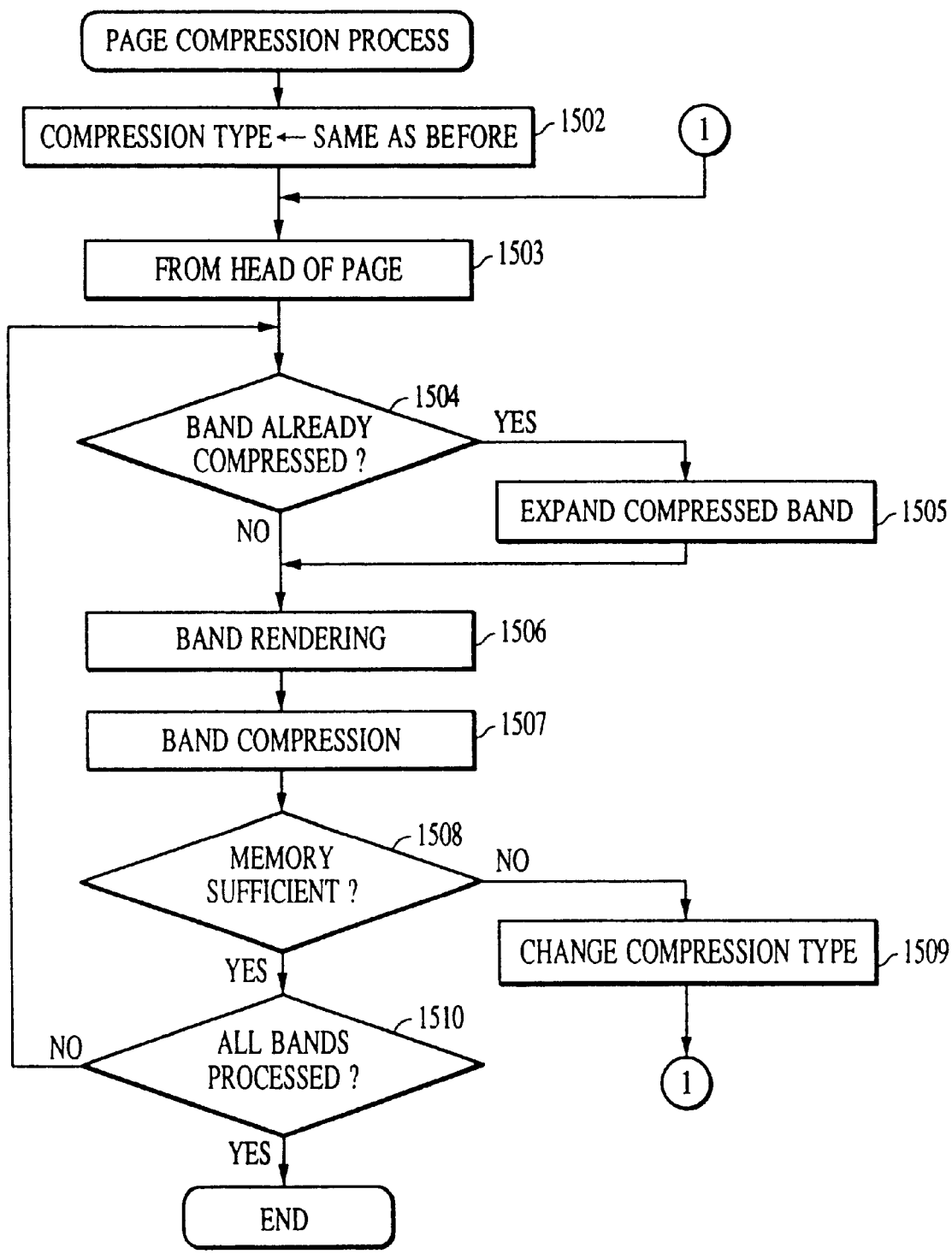
FIG. 16 is a flowchart showing the procedure of a page compression process in Embodiment 1 of the present invention.

FIG. 16 is a flowchart for explaining the process for rendering all the bands for further compression and holding the printing data in the format of compressed data instead of intermediate data when the vacant capacity of the RAM 250 is deficient, as stated above in connection with steps 1403, 1411 and 1413 in FIG. 15.

This process is executed for each of all the bands. Each band is made up of one of two types of data; i.e., compressed data resulted from the page compression process if it has been already executed, and intermediate data for the printing data which has been received after the last page compression process. When the page has not been even once subject to the compression process, all the bands are made up of intermediate data only.

First, in step 1502, the type of compression process to be executed after that is set to the same type as before. Then, steps 1504–1510 are executed repeatedly for all the bands in sequence from the head band of the page.

In the repeated process, it is first checked in step 1504 whether the band to be processed holds compressed data.

If so, then the compressed data is expanded in step 1505 by the compressing/expanding section 280 in accordance with the compression type that is used for the compressed data. The original compressed data is then deleted to increase a vacant area of the RAM 250 as far as possible. Resulting bit map data is loaded in a band raster area which is employed in normal printing output.

Subsequently, in step 1506, rendering is performed after adding the intermediate data of the relevant band to the above bit map data. All the intermediate data having been subject to the rendering is then deleted to further increase a vacant area of the RAM 250.

Finally, in step 1507, a resulting bit map data is compressed by the compressing/expanding section 280 in accordance with the designated compression type and then loaded in the RAM 250 again.

From the determination as to memory deficiency in step 1402 of FIG. 15, it is estimated that the vacant capacity of the RAM 250 will not become deficient. Depending on data, however, memory deficiency occurs because of a poor compression rate. If it is determined in step 1508 that the vacant capacity of the RAM 250 is deficient, then the compression type is changed in step 1509 to another type having a higher compression rate, followed by repeating the process from step 1503. A manner of changing the compression type will be explained below with reference to FIG. 17.

In order that the above process is executed for each of all the bands in the page, it is determined in step 1510 whether all the bands are processed or not.

9. Explanation of Plural Compression Types

Figure 17A:
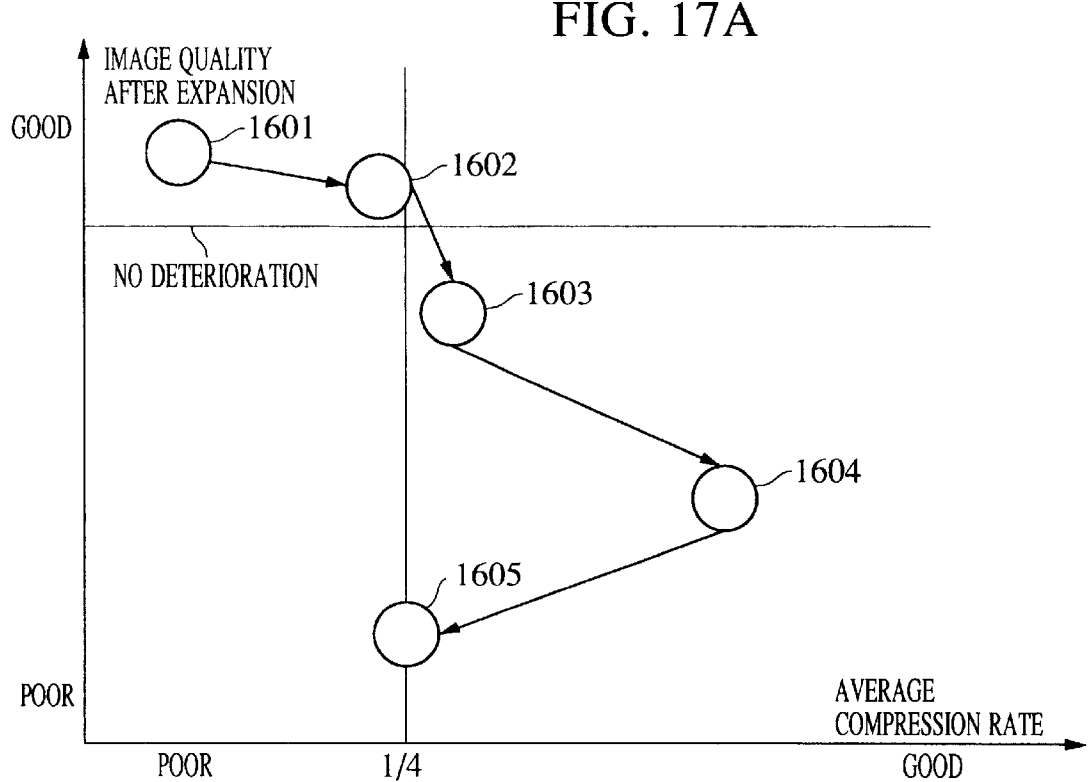
FIGS. 17A and 17B are charts for explaining examples of a manner of selecting desired one of plural compression types.
Figure 17B:
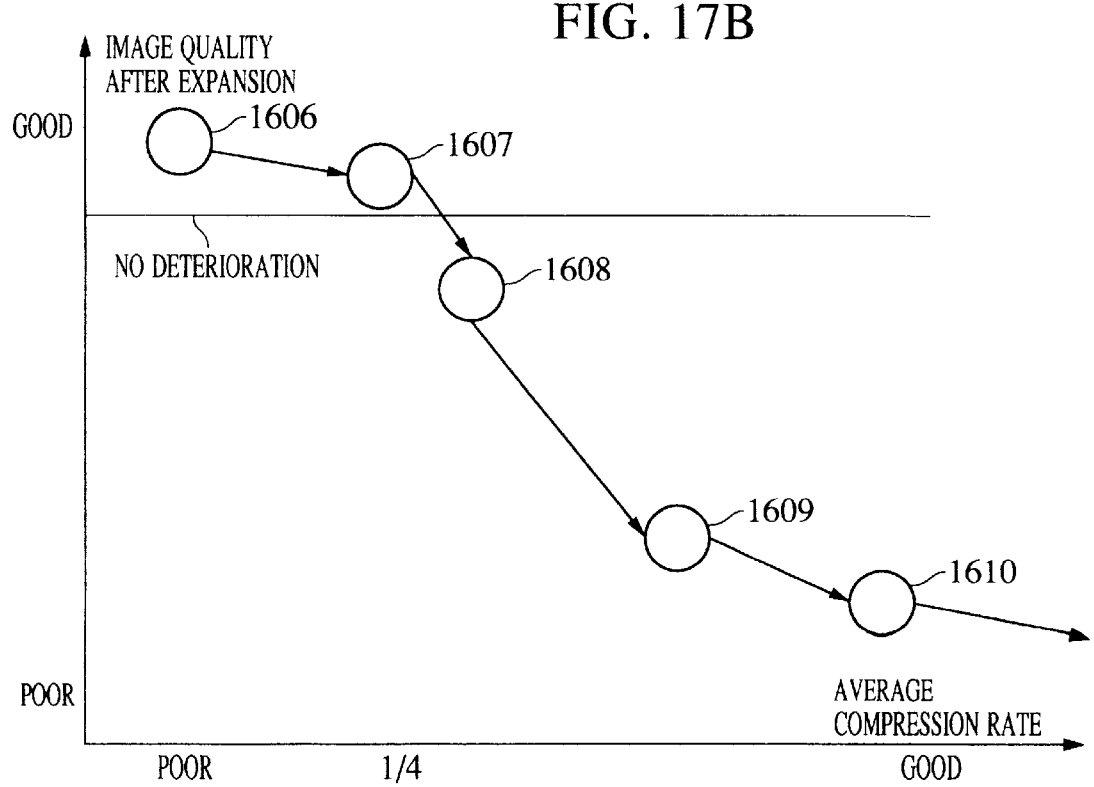

FIGS. 17A and 17B are charts for explaining examples of a manner of selecting desired one of plural compression types.

In FIG. 17A, the horizontal axis represents an average compression rate which increases to make the size of data after compression smaller as the point on the axis proceeds to the right. The vertical axis represents a degradation of image quality after the compression process and the image quality deteriorates less as the point on the axis proceeds upwards. In an area above the line indicating no deterioration, the image quality is substantially the same as original (LossLess compression).

When memory deficiency occurs during the page compression process with the initial compression type set to 1601, the page compression is tried again by using the compression type 1602 having a higher compression rate in the next rank. If memory deficiency still occurs, the compression type 1603 is now selected. If memory deficiency still occurs, the compression type 1604 is selected. In this way, the compression type is changed from one to another while repeating the compression process.

In the case where memory deficiency still occurs even at the finally selected compression rate, the memory deficiency is solved by using a method with which the data size after compression can be reliably calculated, such as a thinning process, although the image quality is deteriorated considerably. In FIG. 17A, the compression type 1605 capable of surely reducing the data size after compression down to ¼ is employed.

Of course, the memory is here assumed to have such a capacity as that when the page compression is made in accordance with the compression type having a compression rate of ¼, all the bands can be held in the memory. With this assumption, all the printing data can be subject to the printing process without causing memory deadlock.

In an alternative method shown in FIG. 17B, image processing is performed by using a band pass filter, for example, to increase the compression rate. This method enables the compression type to be selected from 1606 to 1610 successively by repeating a filtering process until memory deficiency does not occur. Therefore, the state of memory deficiency can be avoided virtually.

10. Explanation of Determination as to Shift to All Bands Compression

Figure 18:
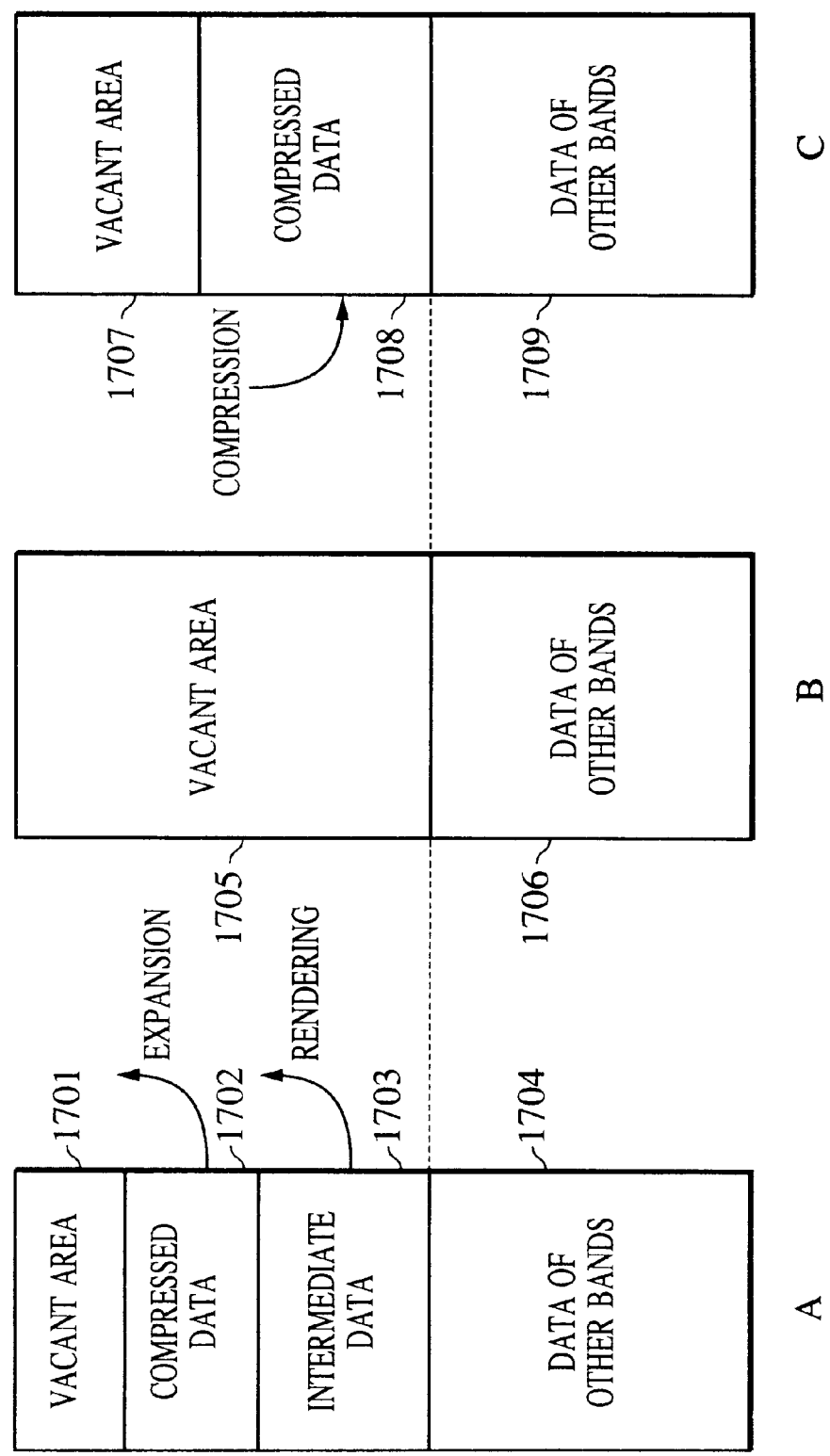
FIG. 18 is a diagram for explaining a manner of determining whether a memory is deficient or not in Embodiment 1 of the present invention.

FIG. 18 is a diagram for explaining a manner of making the determination in step 1402 of FIG. 15 as to whether a memory vacant area required for the page compression process is deficient or not, and a manner of selecting the compression processing type to be executed. FIG. 18 shows a process for one band when the page compression process is executed.

Schematically illustrated at A in FIG. 18 areas of the RAM 250 resulted when executing the expansion (step 1505 in FIG. 16) of the compressed data and rendering (step 1506 in FIG. 16) of the intermediate data in the page compression process.

Denoted by 1701 is a vacant area of the RAM 250, 1702 is the compressed data, 1703 is the intermediate data, and 1704 is the printing data related to other bands. But, when the page compression process is first executed on the relevant page, the compressed data 1702 does not exist.

In the page compression process, the compressed data 1702 of the band to be processed is first expanded and the intermediate data 1703 is then subject to rendering. After these steps, the compressed data 1702 and the intermediate data 1703 are no longer required, the areas occupied by those data can be made empty to increase a vacant area 1705 as shown at B in FIG. 18.

After that, the bit map data of the relevant band is compressed again and then loaded in the vacant area 1705. The stat after the loading is shown at C in FIG. 18 where 1708 represents the compressed data loaded again.

In the page compression process, a sequence of the above-explained steps are executed for all the bands. Whether the memory size required for the page compression process is deficient or not can be determined by examining the sizes of the vacant areas 1701 and 1707 for each band.

Because the data size after compression depends on various factors, e.g., dot distribution of the bit map image to be compressed, it is practically impossible to calculate the size of compressed data prior to the page compression process. Also, the compression efficiency changes depending on the compression type. The data size after compression is therefore calculated based on a compression rate estimated from the compression type.

In this embodiment, the estimated compression ratio is defined as average compression efficiency. It is needless to say that the data size after compression may also be estimated any other suitable method.

A manner of measuring the vacant area will now be explained with reference to FIG. 18.

Assuming for some band (k) that the size of the vacant area 1707 is Sk, the size of the compressed data 1702 of the band is Bk, the size of the intermediate data 1703 of the band is Pk, and the estimated size of the compressed data 1708 after being compressed again is Ak, the relationship between the size S(k-1) of the vacant area 1701 before the banding process and the size Sk of the vacant area 1707 after the banding process is expressed below as will be seen from FIG. 18:

$$Sk=S(k-1)+Bk+Pk-Ak$$

Also, assuming that the total memory size a available for the process is M and the number of bands is n, the size S0 of a vacant area before the start of processing any band is expressed by:

$$S0=M-(B1+B2+\ldots+Bn)-(P1+\ldots+Pn)$$

Here, because Bk, Pk are known for all the bands, Sk can be calculated for the banding process of each band by using estimated values as Ak. A minimum value MIN(Sk) among resulting all values of Sk provides a minimum value of the memory vacant capacity in the page compression process.

The determination in step 1402 of FIG. 15 as to whether the page compression process can be executed or not is made depending on whether the value of MIN(Sk) is not less than zero.

If the value of MIN(Sk) is less than zero, the page compression process is impossible to execute and therefore the minimum value is calculated again after changing the compression type to another type.

As generally known, the compression process has such a feature that the process having high compression efficiency lowers the processing speed and deteriorates image quality to a large extent. On the contrary, the process having low compression efficiency increases the processing speed and can compress data with a less deterioration of image quality (some compression type occurs no deterioration of image quality).

In this embodiment, the printing data of 1 page can be held without essentially causing memory deadlock while suppressing a deterioration of image quality and a speed reduction to minimum, by employing one of the compression types providing the values of MIN(Sk) not less than zero which minimizes a deterioration of image quality.

11. Explanation of Calculation of Rendering Time

Figure 19:
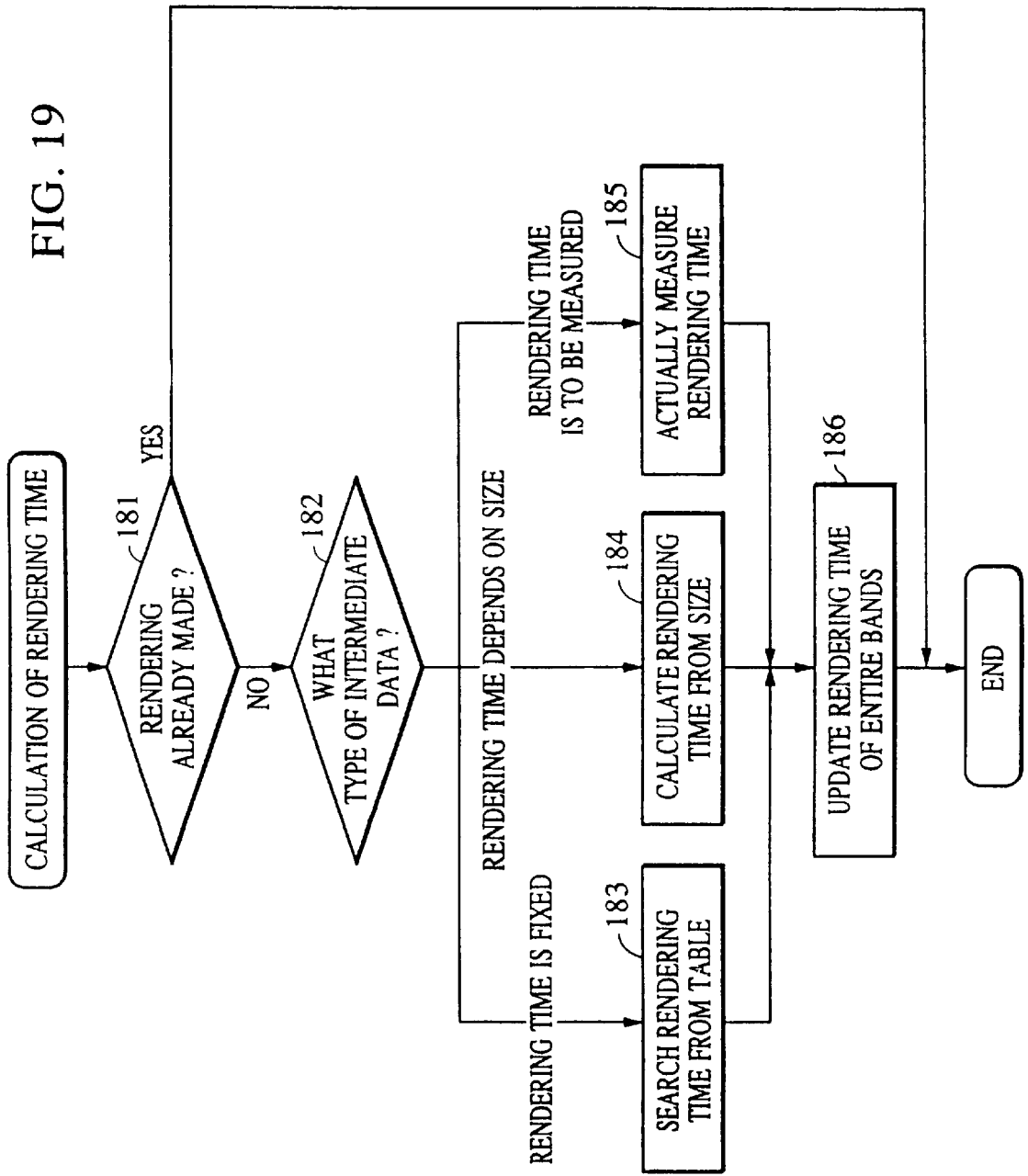
FIG. 19 is a flowchart showing the procedure of a process for calculating the rendering time in Embodiment 1 of the present invention.

FIG. 19 is a flowchart for explaining a method of calculating the rendering time in units of band which is performed in step 1405 of FIG. 15. The rendering time determined in step 1405 is used in comparison with the threshold in the measures-to-overrun process executed in step 1408 of FIG. 15.

First, in step 181, it is checked whether the page compression process has been executed in step 1403 of FIG. 15 as a result of the determination that the vacant memory capacity is deficient when the printing data is loaded in the memory. If the page has been subject to the page compression process, the measures-to-overrun process in step 1408 is not executed as mentioned above. In this case, the control process is finished at once.

Then, in step 182, a method of calculating the rendering time is selected depending on the type of the intermediate data.

As one example, when the intermediate data is of the type that the rendering time is fixedly defined, the control flow branches to step 183 where the rendering time is determined by using, e.g., a correspondence table in which the rendering time is held beforehand corresponding to the intermediate data. This process will be described later with reference to FIG. 20.

As another example, when the intermediate data is of the type, such as an image bit map, that the rendering process is executed by simply copying the memory contents, the control flow branches to step 184 where the rendering time is determined from the size of the intermediate data.

As still another example, when the intermediate data is of the type that the rendering time is unknown until the intermediate data is actually subject to rendering, the control flow branches to step 185 where the rendering process is actually executed to measure the rendering time. This process will be described later with reference to FIG. 21.

It is a matter of course that the above-mentioned branching and other steps may also be executed by using other types of algorithms for calculating the rendering time than explained above.

After executing the rendering time calculation process depending on the type of the intermediate data, the calculated time is added in step 186 to the rendering time of the entire band, thereby completing the process.

Figure 20:
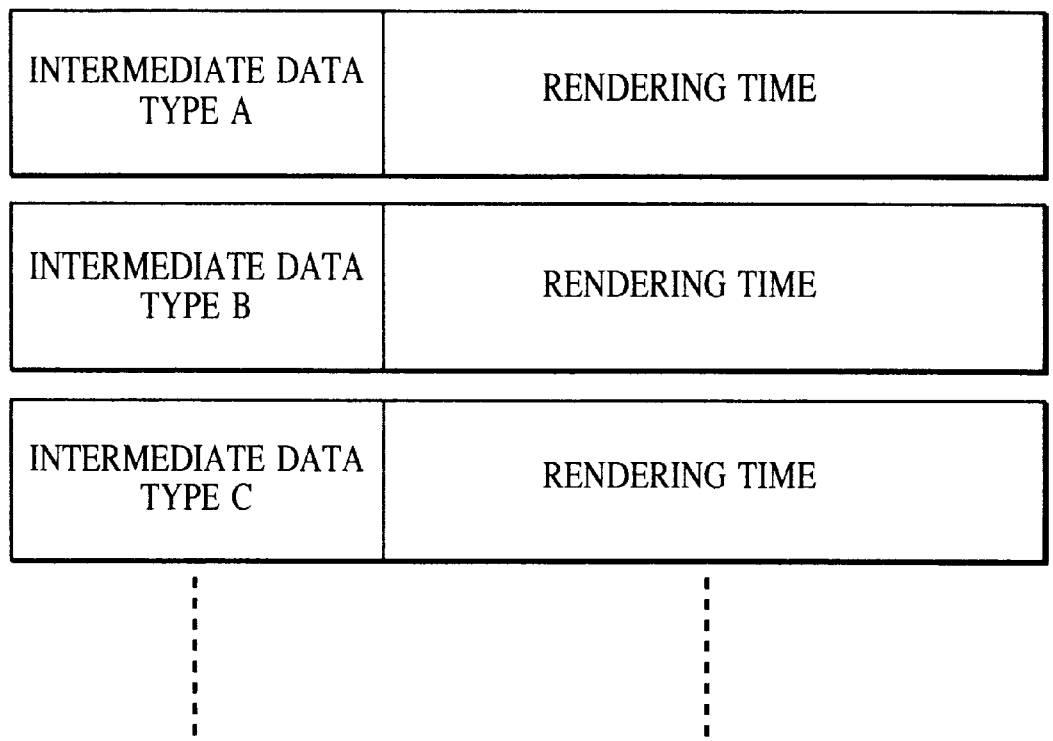
FIG. 20 is a diagram for explaining a process of calculating the rendering time with a fixed table in Embodiment 1 of the present invention.

12. Explanation of Calculation of Rendering Time— Explanation of Method Using Fixed Table FIG. 20 is a diagram for explaining an example of the process for determining the fixed rendering time, which is executed in step 183 of FIG. 19.

For the intermediate data for which the rendering time is fixedly known beforehand, as shown in FIG. 19, the rendering time is searched from a correspondence table in which types A–C of the intermediate data and the corresponding rendering time are held. The table shown in FIG. 20 is stored in the ROM 260 beforehand.

Figure 21:
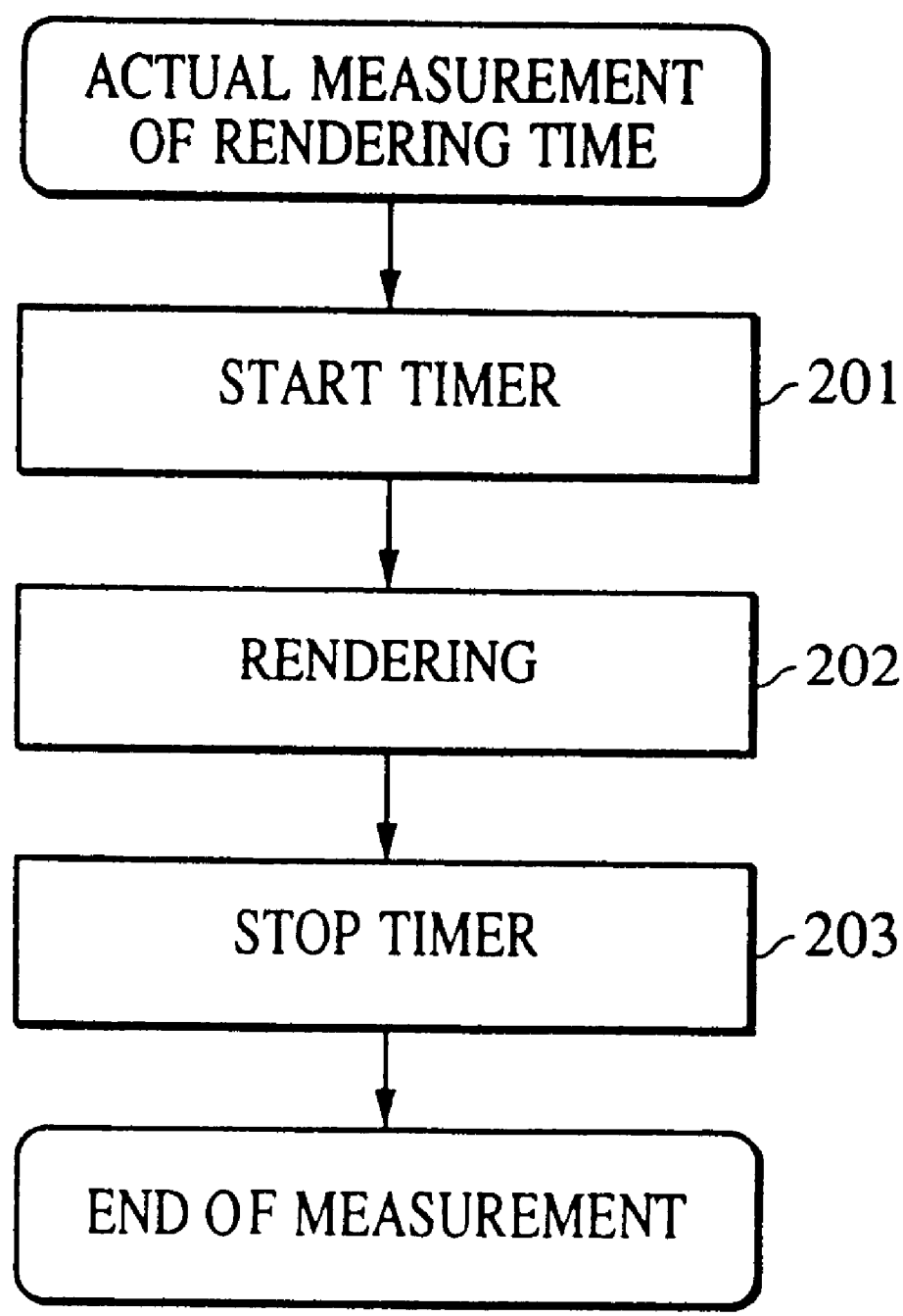
FIG. 21 is a flowchart showing the procedure of a process for actually calculating the rendering time in Embodiment 1 of the present invention.

13. Explanation of Calculation of Rendering Time-Explanation of Actually Measuring Method FIG. 21 is a flowchart for explaining an example of the process for actually measuring the rendering time, which is executed in step 185 of FIG. 19.

In step 201, an internal timer of the printing apparatus is started and, in step 202, the intermediate data to be measured is subject to rendering in a like manner as the actual rendering process. Upon completion of the rendering, the timer is stopped in step 203 and a time period measured by the timer is given as the rendering time.

14. Explanation of Measures to Overrun

Figure 22:
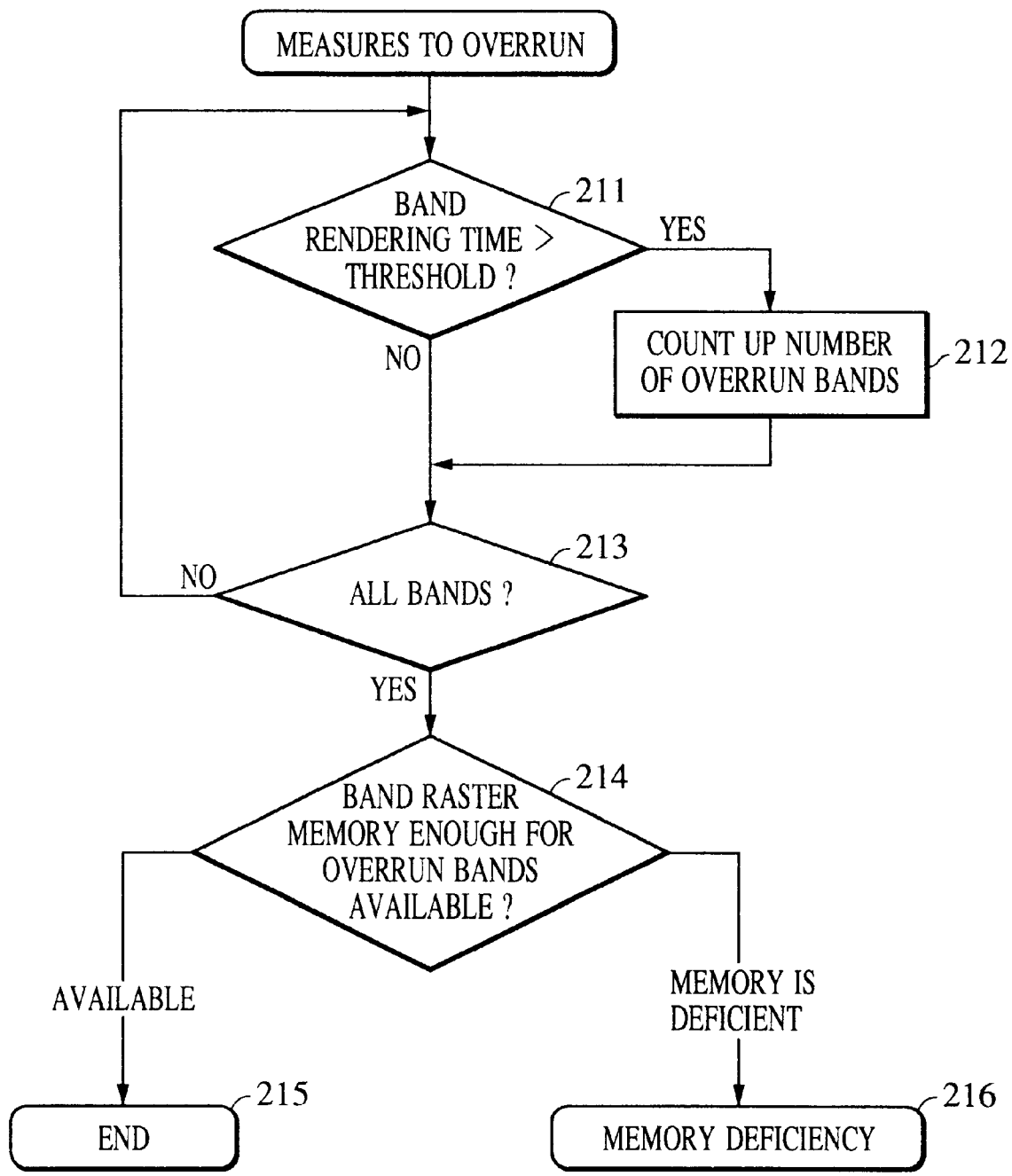
FIG. 22 is a flowchart showing the procedure of a process for taking measures to print overrun in Embodiment 1 of the present invention.

FIG. 22 is a flowchart for explaining the measures-to-overrun process executed in step 1408 in FIG. 15.

First, in step 211, the rendering time of the entire band and the threshold explained in connection with step 1408 are compared as explained before. If the rendering time exceeds the threshold, then the bands undergoing print overrun (referred to overrun bands hereinafter) is counted up in step 212.

The above process of steps 211, 212 is repeated until it is determined in step 213 that all the bands are processed.

After the counting-up process is completed for one page, it is checked in step 214 whether temporary band rasters corresponding to the number of the overrun bands can be secured in the RAM 250 at the present. The checked result is output in step 215 or step 216, thereby ending the process.

If memory deficiency is determined in this process, then the band compression process explained below is executed.

15. Explanation of Band Compression Process

Figure 23:
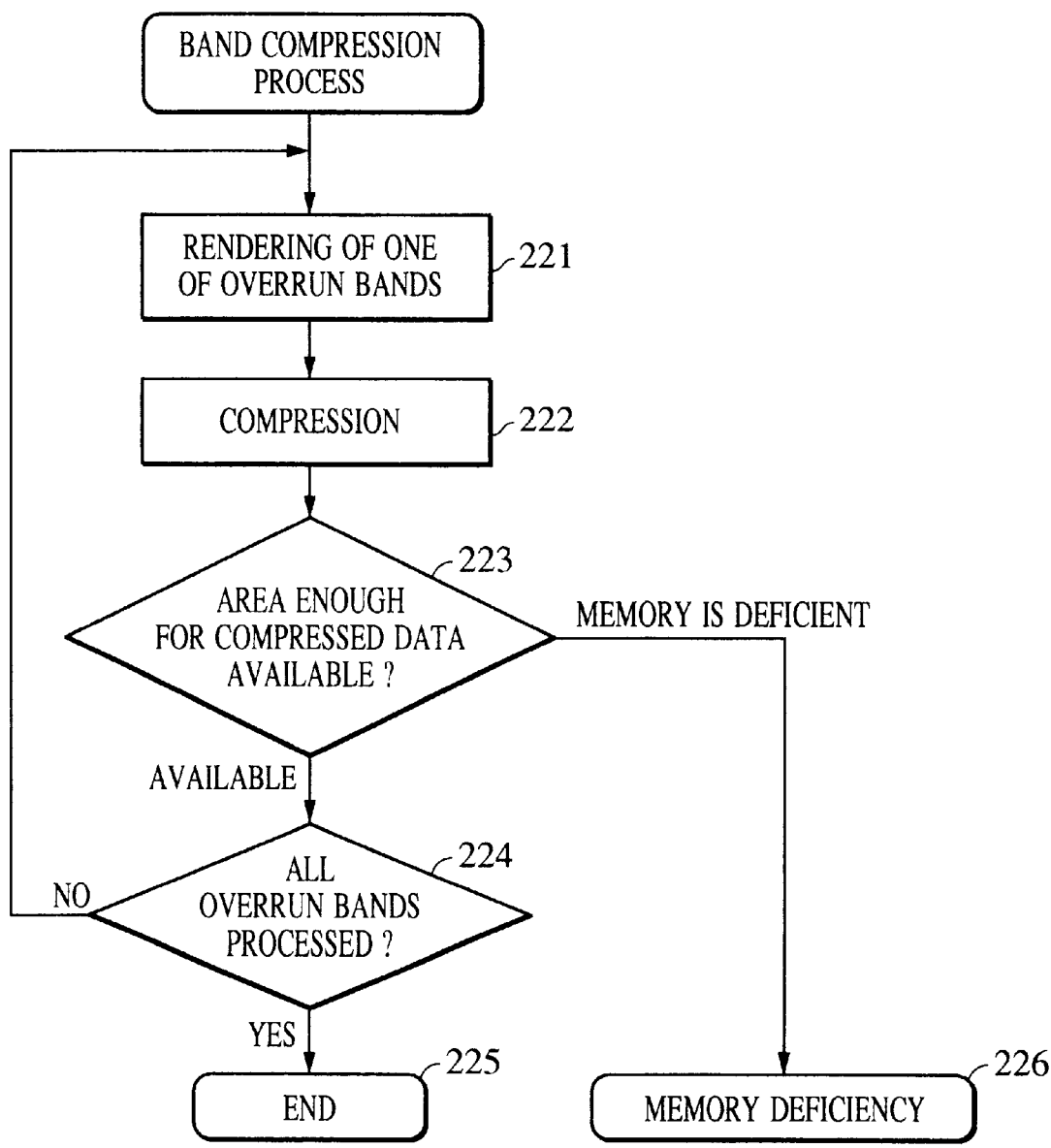
FIG. 23 is a flowchart showing the procedure of a band compression process in Embodiment 1 of the present i invention.

FIG. 23 is a flowchart for explaining the band compression process of converting the intermediate data of the overrun bands into compressed data when temporary band raster areas for the overrun bands cannot be secured because of the vacant area of the RAM 250 being deficient, as explained above in connection with step 1410 in FIG. 15.

First, in step 221, one of the overrun bands is subject to rendering. Then, in step 222, a resulting bit map image is converted into compressed data with the compression function of the compressing/expanding section 280.

Subsequently, it is checked in step 223 whether the compressed data can be loaded in the vacant area of the RAM 250. If the vacant area is deficient, then the result of memory deficiency is issued in step 226, thereby ending the band compression process.

If the compressed data can be loaded in the memory, then the above process from step 211 is repeated until it is determined in step 224 that all the overrun bands have been processed.

When this process is ended with the result of memory deficiency, the process of compressing the full page (step 1413 in FIG. 15) is executed as stated before.

16. Explanation of Printing Output Process

Figure 24:
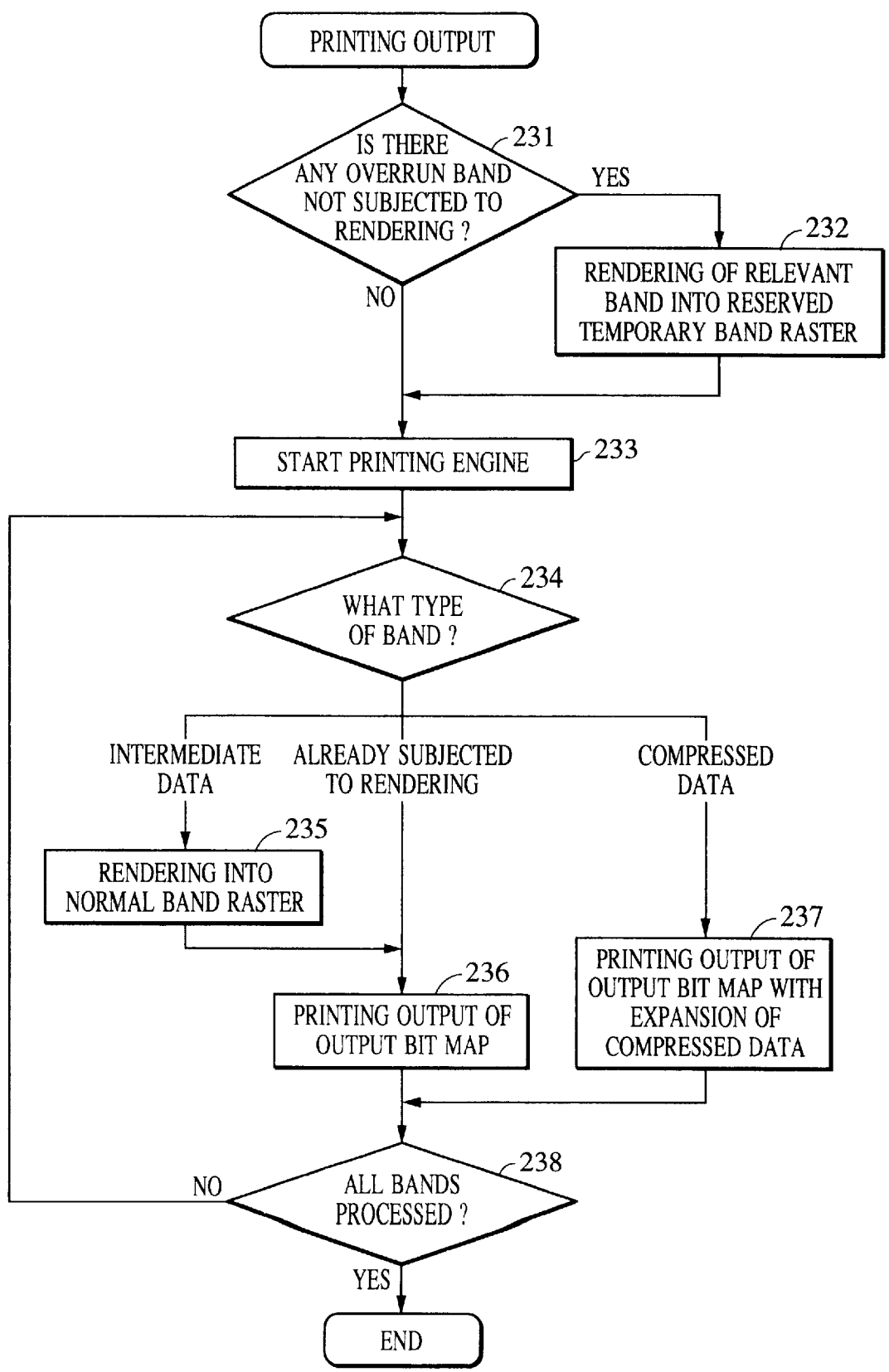
FIG. 24 is a flowchart showing the procedure of printing output in Embodiment 1 of the present invention.

FIG. 24 is a flowchart for explaining the printing output process shown in step 1414 of FIG. 15.

First, the printing output process is executed on the temporary band rasters for the overrun bands, which have been reserved in the measures-to-overrun process explained above in connection with FIG. 22.

It is checked in step 231 whether there are temporary band rasters for the overrun bands. If the temporary band raster areas for the overrun bands are secured, then the intermediate data of the corresponding band is subject to rendering into one of the temporary band rasters in step 232.

At this time, since the printing is not yet started, there occurs no print overrun even if the rendering process takes time.

Next, in step 233, the printing engine is started to perform printing output onto a sheet of paper.

It is then checked in step 234 which format is used to hold the printing data of the relevant band.

If the printing data is intermediate data, then the control flow branches to step 235 where the intermediate data is subject to rendering and a resulting printing image is loaded in the normal band raster.

In this rendering process, because the overrun bands are omitted beforehand as explained above, there occurs no print overrun.

After that, the printing image is output in step 236 for printing onto a sheet of paper. If it is determined in step 234 that the printing data of the relevant band is of the type that rendering of the intermediate thereof has been already made into the temporary band raster in step 232, then the printing data is immediately output for printing in step 236 because that printing data is an image capable of being output as it is.

If the printing data of the relevant band is compressed data created by the band compression process or the page compression process, then printing output is performed in step 237 while expanding the compressed data. In this case, as stated above, because the processing speed of the expansion process is set in this embodiment to be sufficiently higher than the output speed of the printing engine, there occurs no print overrun.

Finally, it is determined in step 238 whether the printing output process has been completed for all the bands. If not yet, then the above process from step 234 is repeated.

As described above, according to this Embodiment 1, a guarantee that all pages are surely printed can be realized inexpensively while holding down the capacity required for a memory to a reasonable level, without causing print overrun and memory deadlock.

Also, the feature of converting image data by the compression process provides another advantage that printing with high resolution can be achieved with less capacity of the memory.

Embodiment 2

Figure 25:
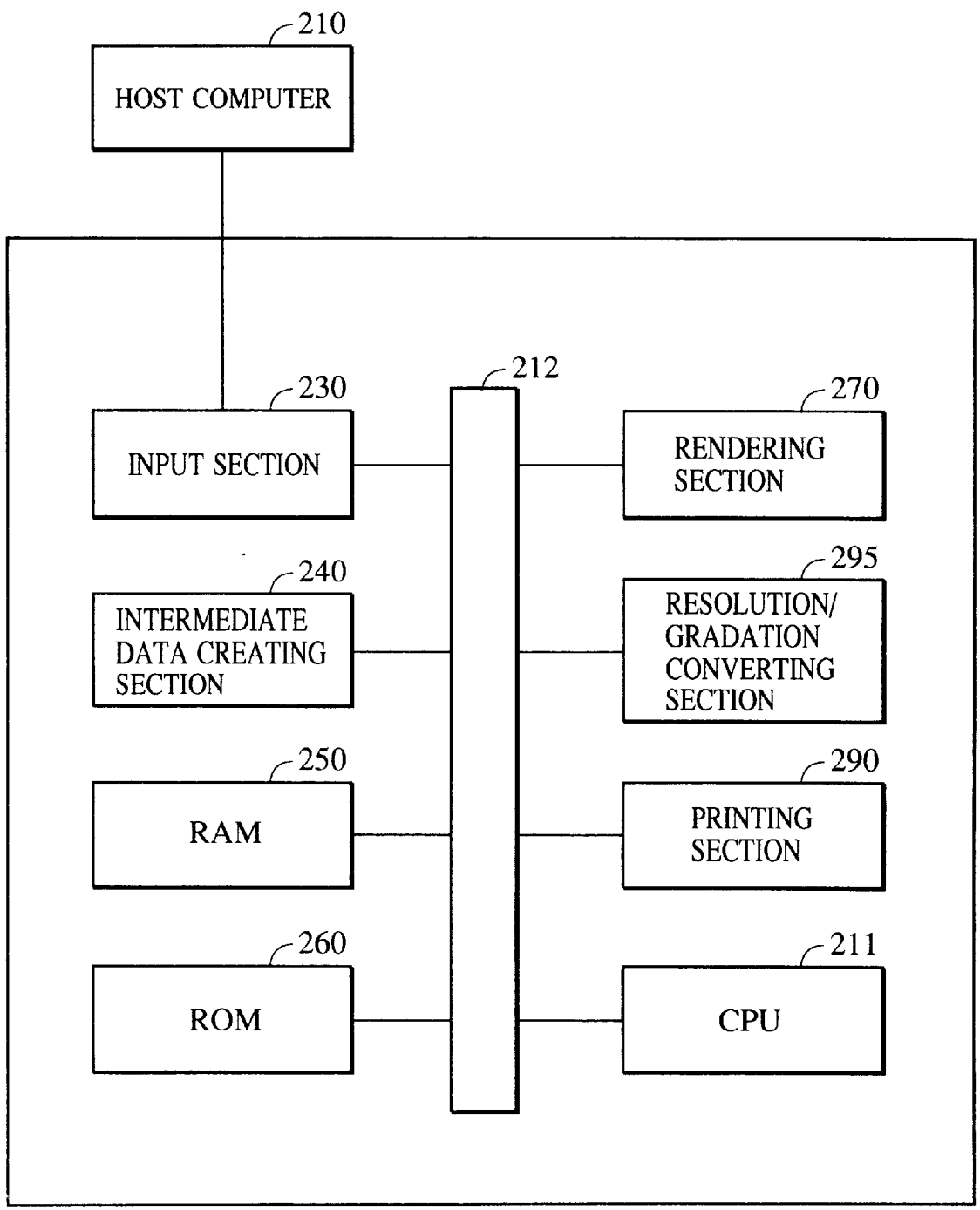
FIG. 25 is a block diagram for explaining the configuration of a printer control system in Embodiment 2 of the present invention.

FIG. 25 is a block diagram for explaining the configuration of a printer control system in Embodiment 2 of the present invention. This embodiment will be also described in connection with, by way of example, a laser beam printer (see FIG. 1).

The printing apparatus according to Embodiment 2 is featured in that data conversion is performed by a resolution/gradation converting section 295 to reduce the size of a printing image resulted from rendering.

The resolution/gradation converting section 295 reduces resolution or gradation of the printing image resulted from rendering. For example, the resolution is reduced by a method of thinning dots of the image, and the gradation is reduced by using a dithering process generally known.

With a feature of this embodiment, the capacity of the RAM 250 is larger than the size of the printing image of 1 page resulted after data conversion performed by the resolution/gradation converting section 295.

When printing is made onto an A4-size sheet of paper by a color printer having a printing ability of 8 bits for each of four planes of YMCK with 600 DPI, for example, the size of a printing output image is about 128 M bytes. But if resolution of the printing image is reduced down to 300 DPI through resolution conversion and the number of output bits is converted into 1 bit through gradation conversion, the size of the printing output image is about 4 M bytes.

Therefore, the RAM 250 has a feature that it has a size corresponding to at least 4 M bytes+working area.

Other sections in FIG. 25 function in the same manner as the corresponding sections of Embodiment 1 shown in FIG. 2.

A procedure of printing one page will be explained below.

The procedure of printing one page in Embodiment 2 is basically similar to the procedure in Embodiment 1 explained above with reference to FIG. 15, but is featured in that the data conversion process is performed as resolution conversion/gradation conversion. The procedure is as follows.

Figure 26:
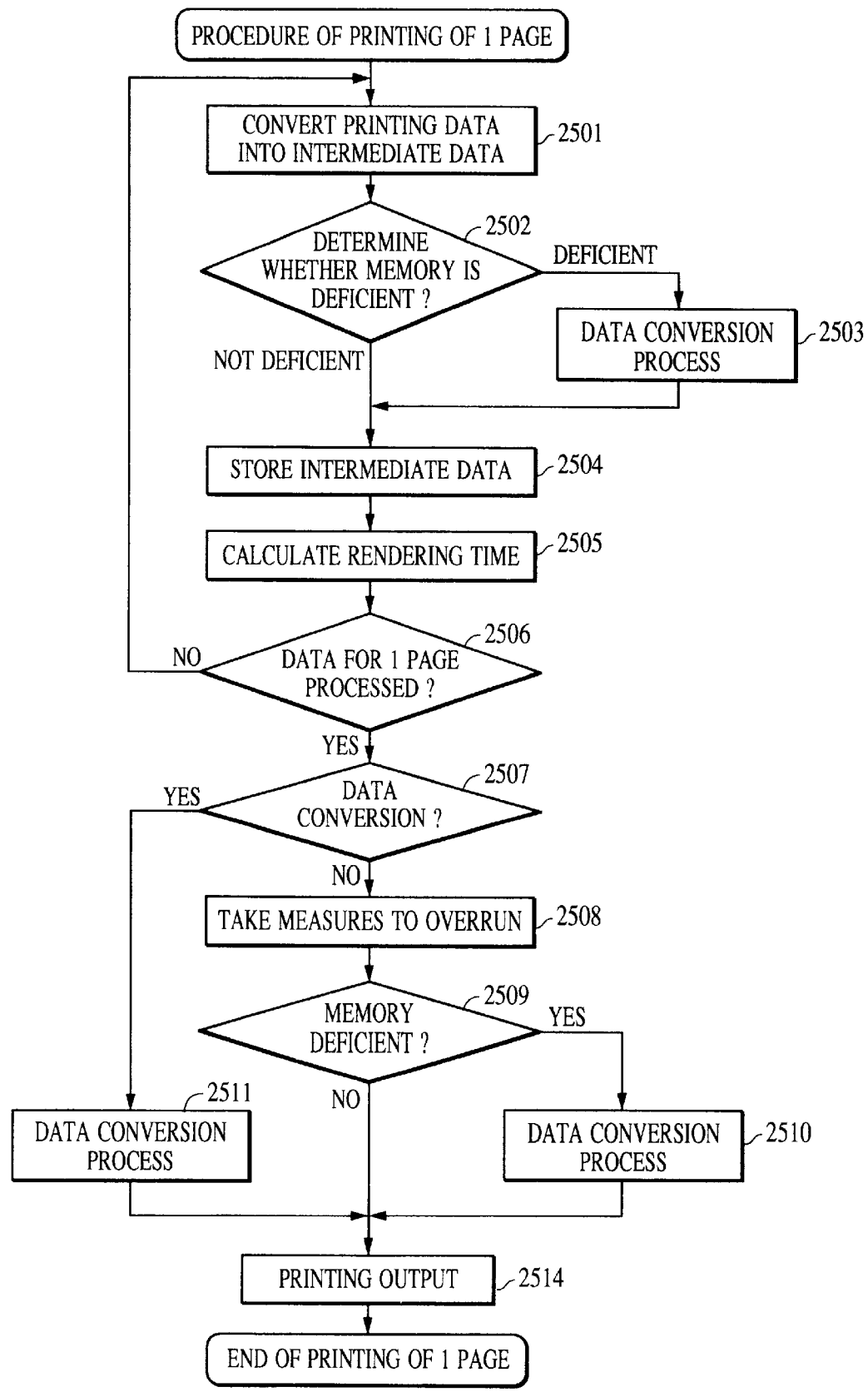
FIG. 26 is a flowchart showing the procedure of printing of 1 page in Embodiment 2 of the present invention.

FIG. 26 is a flowchart showing a procedure from reception of printing data of 1 page to printing output thereof in the printer control system according to Embodiment 2 of the present invention.

In step 2501, as with step 1401 in FIG. 15, printing data transferred from the host computer 210 and received by the input section 230 is converted into intermediate data by the intermediate data creating section 240.

(Checking of Shift to Degradation)

Next, in step 2502, it is determined whether the memory is deficient or not for loading the converted intermediate data in the RAM 250. Whether the memory is deficient or not is determined in consideration of not only whether an actual vacant memory size is sufficient, but also whether the data compression process explained below can be executed.

A method of making the above determinations will be described later in detail with reference to FIG. 27.

(Shift to Degradation)

If the memory is determined to be deficient in step 2502, then the control flow goes to step 1403 where all the intermediate data created so far is subject to rendering and data conversion (resolution conversion/-gradation conversion), and resulting converted data is loaded in the RAM 250 again. On this occasion, the intermediate data having been converted is omitted to secure a vacant memory as large as possible for loading the intermediate data to be processed in the RAM 250.

As mentioned above, the RAM 250 has a capacity enough to hold the printing image of 1 page resulted after the data conversion. Executing the above step therefore guarantees that there will not occur memory deadlock when the intermediate data is created.

Figure 28:
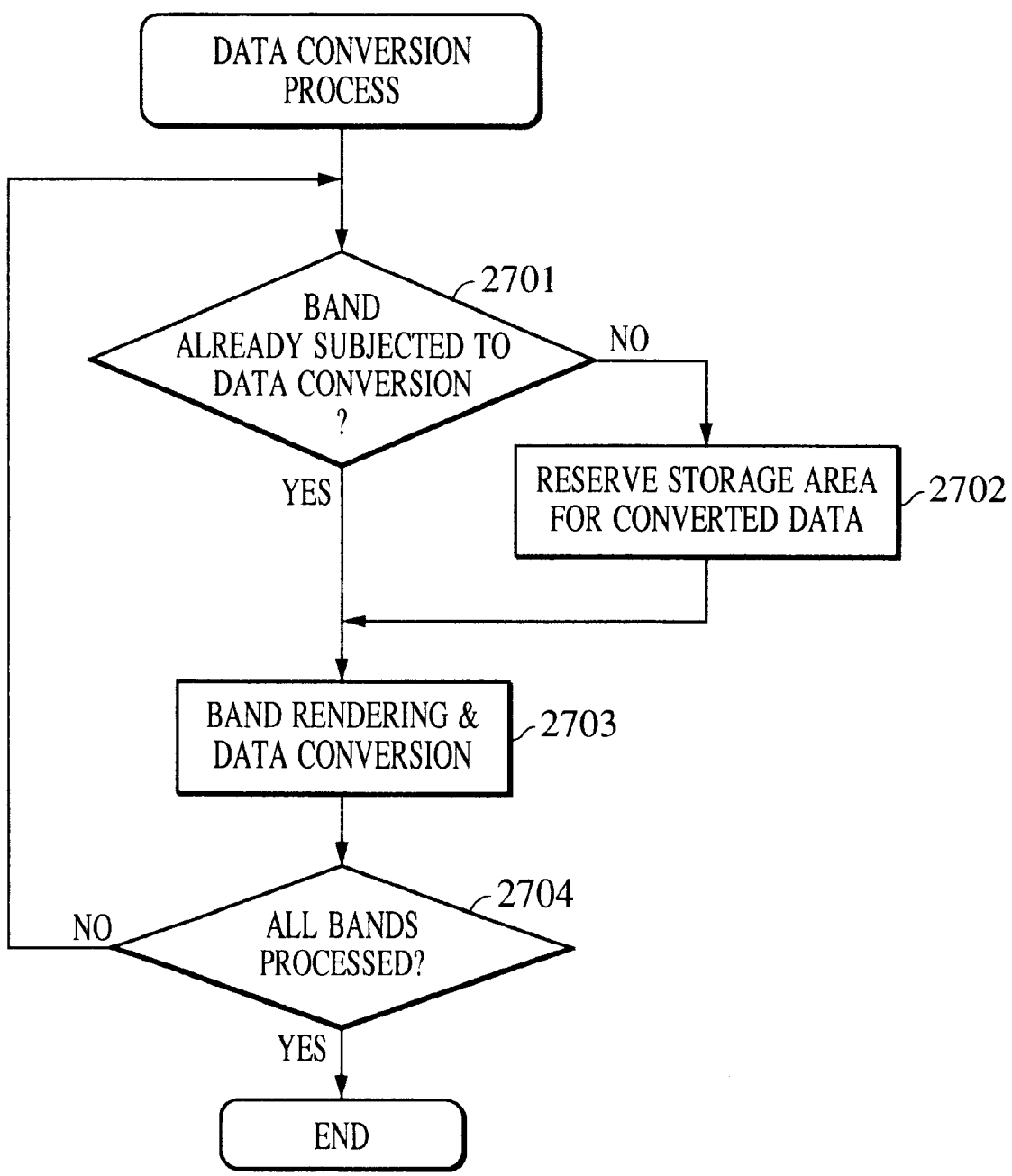
FIG. 28 is a flowchart showing the procedure of a data conversion process in Embodiment 2 of the present invention.

The above data conversion process will be described later in detail with reference to FIG. 28.

After that, in step 2504, the intermediate data under processing is actually loaded in the RAM 250.

(Calculation for Pre-Rendering—Same as in Embodiment 1)

Next, in step 2505, calculation for the process of avoiding print overrun is executed. This calculation is the same as step 1405 in Embodiment 1 explained above in connection with FIG. 15.

Then, in step 2506, it is determined whether the printing data of 1 page has been processed or not. If the page is not yet completely processed, then the above-stated process from step 2501 is repeated for the next printing data.

(Processing after Degradation)

After the printing data of 1 page has been processed, it is checked in step 2507 whether the page has been subject even once to the data conversion process (step 2503). If so, then the control flow goes to step 2511 for converting all the printing data.

In step 2511, all the intermediate data created after execution of the last data conversion process (step 2503) is subject to rendering and data conversion process. This process is the same as the data conversion process executed in step 2503, and will be described later with reference to FIG. 28.

Eventually, the printing data is held in the RAM 250 in the format of converted data for all the bands. The control flow then goes to the printing output process in step 2514.

(Pre-Rendering Process)

On the other hand, if it is determined in step 2507 that the data conversion process has not been executed so far even once, then the print-overrun avoidance process is executed in step 2508.

In this process, as with Embodiment 1, the bands undergoing print overrun are determined and allocated to respective temporary band rasters.

If the capacity of the RAM 250 does not become deficient as a result of the process in step 2508, then the bands undergoing print overrun are all subject to rendering and thereafter printing output is actually performed onto a sheet of paper in step 2514. This printing output process will be described later in detail with reference to FIG. 29.

If the capacity of the RAM 250 is deficient, then the data conversion process is executed in step 2513 on all the bands including those bands not undergoing print overrun in a like manner as in steps 2503 and 2511.

This page compression process will be described later with reference to FIG. 28.

After the printing data of 1 page has been thus held in the RAM 250 in the format of intermediate data or output images having been subject to data conversion with a guarantee that all the bands will not undergo print overrun, printing output is actually performed onto a sheet of paper in step 2514. This process will be described later with reference to FIG. 29.

Figure 27:
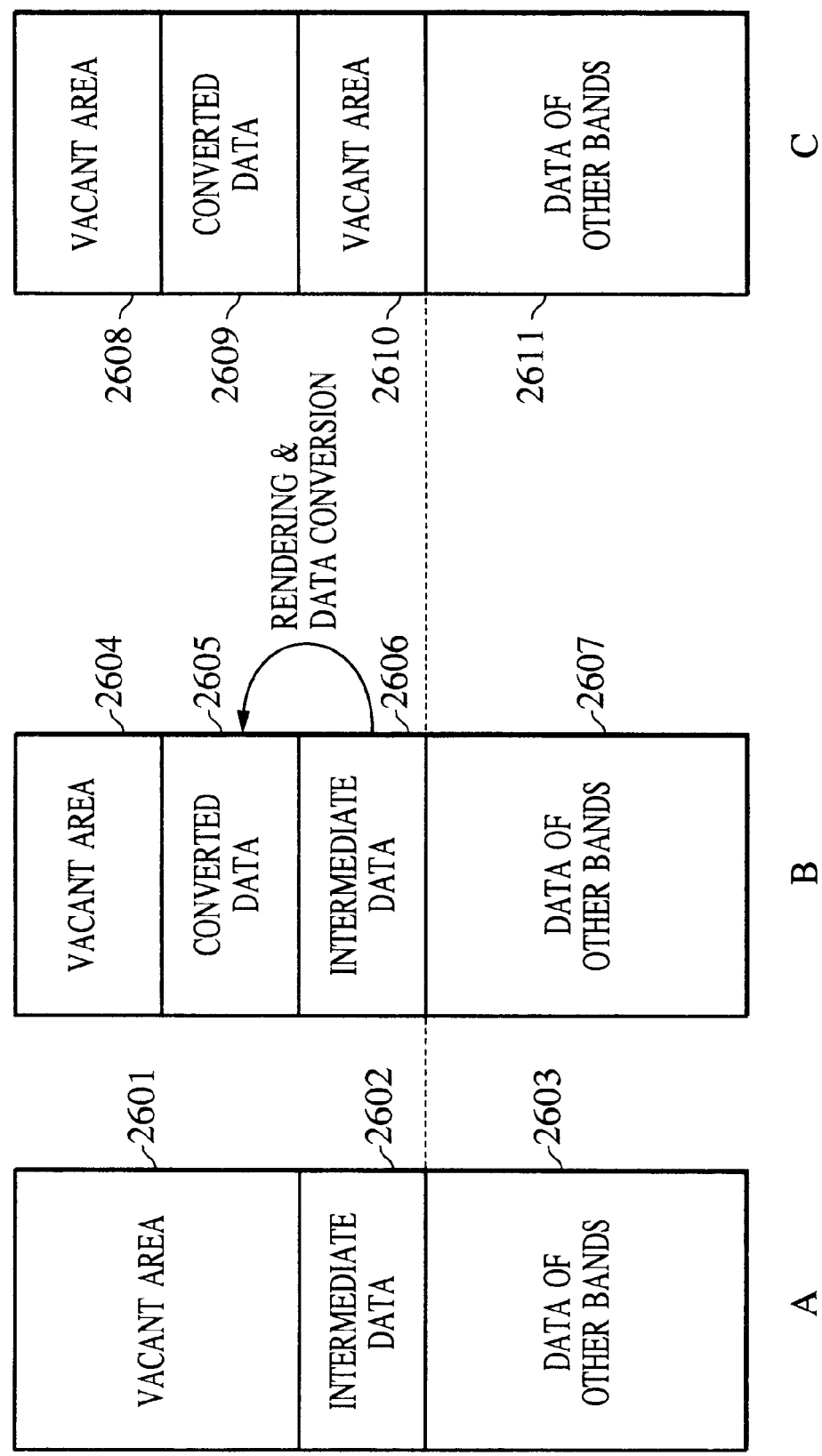
FIG. 27 is a diagram for explaining a method of determining whether a memory is deficient or not in Embodiment 2 of the present invention.

FIG. 27 is a diagram for explaining a manner of making the determination in step 2502 of FIG. 26 as to whether a memory vacant area required for the data conversion process is deficient or not. FIG. 27 shows a process for one band when the data conversion process is executed.

Schematically illustrated at A in FIG. 27 areas of the RAM 250 resulted when executing the data conversion process.

Denoted by 2601 is a vacant area of the RAM 250, 2602 is the intermediate data to be processed, and 2603 is the printing data related to other bands.

When the data conversion process is first executed, a converted data area 2605 is reserved in the vacant area, and the intermediate data 2602 is then subject to rendering and data conversion, followed by loading the converted data again, as shown at B in FIG. 27.

In this embodiment, because the data conversion process is executed as resolution conversion/gradation conversion, the size of the converted data area 2605 can be determined with no need of actually executing the data conversion process.

When the resolution is converted from 600 DPI into 300 DPI, for example, by the resolution conversion process, the data size is reduced down to ¼ as a result of the resolution conversion process. Also, when the gradation is reduced from 8 bits to 1 bit, for example, by the gradation conversion process, the data size is reduced down to ⅛ as a result of the gradation conversion process. If both the types of conversion are made, the data size after the conversion is reduced down to 1/32.

It is needless to say that while the data conversion process is executed as resolution conversion/gradation conversion, by way of example, in this embodiment, data conversion is not limited to those two types, but may be executed by any of other similar conversion processes.

In the case where the data conversion process is already executed, the converted data area 2605 is present and therefore it is possible to perform rendering and data conversion by utilizing the area 2605 with no need of newly reserving a vacant area.

After the data conversion, since the intermediate data 2606 is no longer required, the data 2606 is omitted to create a vacant area 2610 as shown at C in FIG. 27.

If necessary, converted data 2609 may be moved so that the vacant areas 2608 and 2610 are joined together into a continuous area.

In the data conversion process, a sequence of the above-explained steps are executed for all the bands. If the data conversion process has been executed even once, the converted data area already exists in the second and subsequent data conversion process, and therefore the vacant area will never become deficient during the data conversion process.

On the other hand, for the first data conversion process, whether the memory size required for the data conversion process is deficient or not can be determined by examining the size of a vacant area 2604 for each band.

Assuming for some band (k) that the size of the vacant area 2604 is Sk, the size of the compressed data 2605 is B, the size of the intermediate data 2602 is Pk, and the size of the intermediate data to be loaded in the RAM 250 is PC, the relationship between the size S(k−1) of the vacant area 2601 before the data conversion process and the size Sk of the vacant area 2608 after the data conversion process is expressed below as will be seen from FIG. 27:

$$Sk=S(k-1)+Pk-B-PC$$

Also, assuming that the total memory available for the process is M and the number of bands is n, the size SO of a vacant area before the start of processing any band is expressed by:

$$S0=M-(P1+ \ldots +Pn)-B$$

However, where the intermediate data to be stored in the RAM 250 is of the first band, the vacant are size SO is given as follows:

$$S0=M-(P1+ \ldots +Pn)-B-PC$$

Here, because M, B, PC and Pk of all the bands are known, Sk can be calculated for each band. A minimum value MIN(Sk) among resulting all values of Sk provides a minimum value of the memory vacant capacity in the data conversion process.

When the value of MIN(Sk) is less than zero, it is determined that the data conversion process is impossible to execute if the intermediate data to be loaded is loaded as it is.

As described above, after determining in step 2502 in FIG. 26 whether the data conversion process becomes impossible to execute because of memory deficiency if the intermediate data is loaded as it is, the intermediate data is directly loaded (step 2504) when the memory is determined to be not deficient, and is loaded after being subject to the data conversion process (step 2503) when the memory is determined to be deficient. Therefore, all the data conversion processes can be always executed with a success and the printing data can be received without causing memory deadlock.

The data conversion processes executed when the memory is determined to be deficient will be explained below with reference to FIG. 28.

First, it is determined in step 2701 whether the band to be processed is already subject to data conversion. If not yet subject to data conversion, then a converted data storage area having the known size is reserved in step 2702. Because it is assured that such a converted data storage area can be reserved from the above-stated process of determining whether memory deficiency occurs or not, there will never occur memory deadlock.

Then, in step 2703, the intermediate data is subject to rendering and the data conversion process by the resolution/gradation converting section 295. Thus, the .LIZ printing data of the band is managed in the form of converted data.

Finally, the control flow is looped back to step 2701 until it is determined in step 2704 that a sequence of processing steps stated above are executed for all the bands.

As a result of the above-explained process, all the printing data can be output for printing without causing memory deadlock.

Figure 29:
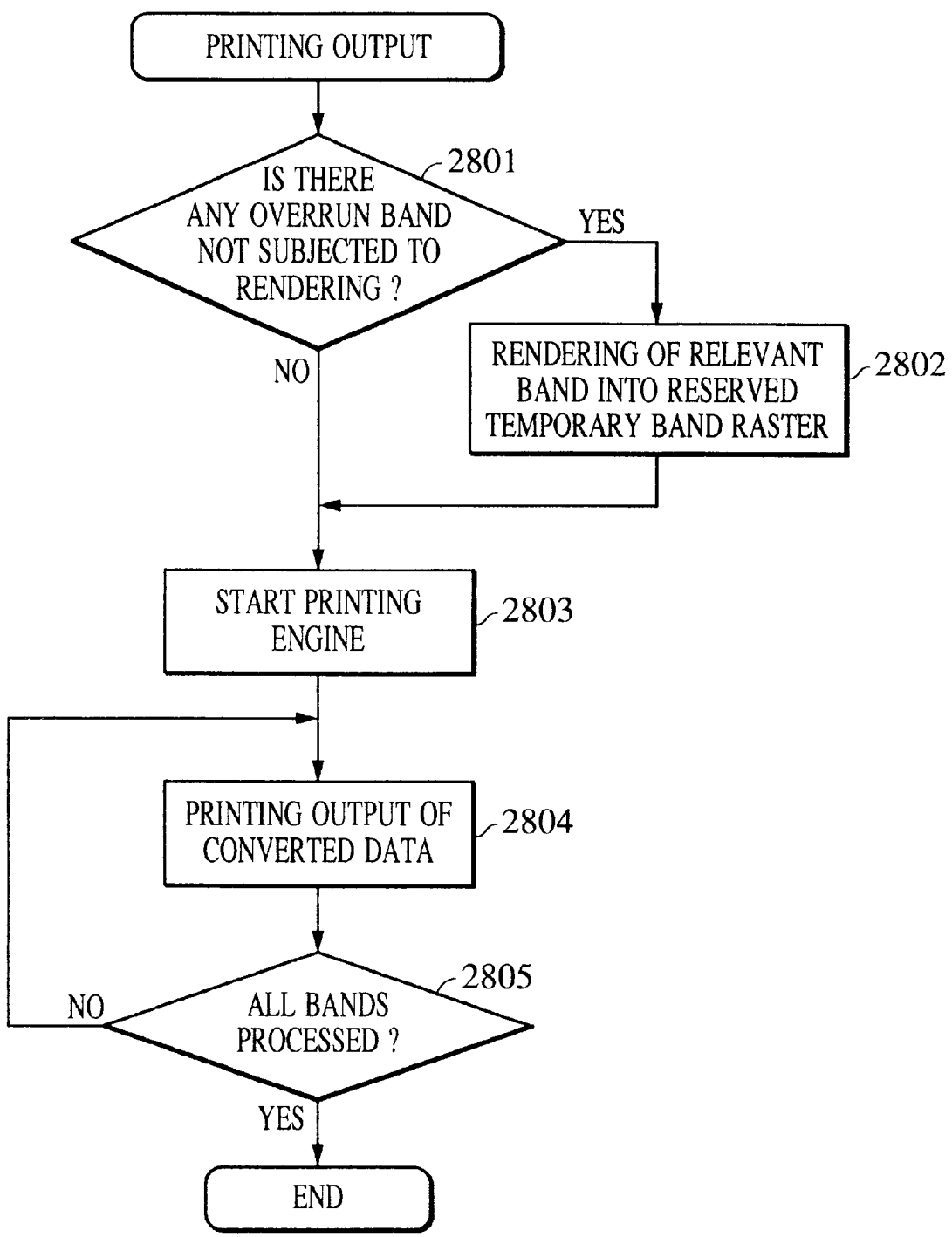
FIG. 29 is a flowchart showing the procedure of printing output in Embodiment 2 of the present invention.

Explanation of FIG. 29 (Printing Output Process)

At the last, details of the printing output process executed in step 2514 of FIG. 26 will be explained with reference to FIG. 29.

First, in steps 2801–2802, rendering of the overrun bands is performed into temporary band rasters for the purpose of taking the measures to print overrun. This process is the same as in Embodiment 1.

Next, in step 2803, the printing engine is actually started.

After the start of the shipping, the converted printing image data is directly output for printing to the printing engine, and the above process from step 2804 is repeated until it is determined in step 2805 that all the bands have been subject to the printing output process.

As described above, according to this Embodiment 2, a guarantee that all pages are surely printed can be realized inexpensively while holding down the capacity required for a memory to a reasonable level, without causing print overrun and memory deadlock.

Also, as generally known, the resolution conversion process and the gradation conversion process are simpler than the page compression process, have a higher processing speed, and require no especial hardware.

Thus, with the feature of converting image data by the resolution conversion process and/or the gradation conversion process and hence giving a guarantee that converted of 1 page can be always loaded in a memory after processing, Embodiment 2 has a specific advantage that the processing speed is higher than when using the compression process, and the cost is reduced because of no need of especial hardware, although image quality is relatively deteriorated.

As is apparent from the above description, the printing apparatus and the printing data processing method of the present invention can provide advantages as follows. A guarantee that all pages are surely printed can be realized inexpensively while holding down the capacity required for a memory to a reasonable level, without causing print overrun and memory deadlock.

Also, with the feature of converting image data by the compression process, printing with high resolution can be achieved with less capacity of the memory.

Further, with the feature of converting image data by the resolution conversion process and/or the gradation conversion process, the printing process can be executed at a high speed.

Note that, as mentioned above in connection with Embodiment 1, Embodiments 1 and 2 may be combined with each other in a suitable way by, e.g., applying the resolution conversion process and/or the gradation conversion process employed in Embodiment 2 to the data conversion process in Embodiment 1.

It is to be understood that the present invention is not limited to the embodiments illustrated here, but may be modified in various ways without departing from the scope of the appended claims.

What is claimed is:

1. A printing apparatus comprising:

means for managing printing data in units of a band, means for performing one band of rendering and another band of rendered print data shipping to a print engine in parallel, means for performing data conversion of an image in units of a band, means for restoring data resulted from the data conversion to the original data in units of a band, means for merging the restored data with other data in units of a band, means for shipping the restored data, means for determining whether the data conversion is to be performed or not, means for calculating a size of the printing data, means for calculating a data size after the data conversion, means for calculating a time required for rendering, means for changing the timing of rendering, and means for determining whether the timing of rendering is to be changed or not.

2. The printing apparatus according to claim 1, wherein the data conversion of the image is performed by a compression process.

3. The printing apparatus according to claim 1, wherein the data conversion of the image is performed by a resolution lowering process and/or a gradation lowering process.

4. The printing apparatus according to claim 1, wherein the determination as to whether the data conversion is to be performed or not includes determination as to which one of plural data conversion types is employed.

5. The printing apparatus according to claim 1, wherein when calculating the data size after the data conversion, the data size is calculated by estimating a size of the converted data based on the conversion type.

6. The printing apparatus according to claim 1, wherein said means for changing the timing of rendering includes the steps of reserving a temporary raster memory and performing rendering of the data into said temporary raster memory prior to shipping of the data.

7. The printing apparatus according to claim 1, wherein the determination as to whether the timing of rendering is to be changed or not is made per band.

8. The printing apparatus according to claim 7, wherein the determination as to whether the timing of rendering of each band is to be changed or not is made by comparing a band rendering time with a threshold determined from a band height and a paper feeding speed.

9. The printing apparatus according to claim 7, wherein the determination as to whether the timing of rendering of each band is to be changed or not is made by comparing a band rendering time with a threshold determined from a time period from the end of rendering of the previous band to the start of rendering of the relevant band.

10. An apparatus in which printing data is subject to rendering in units of a band, and rendering of one band and shipping of another band having been subject to rendering are performed in parallel, said apparatus comprising:

first determining means for determining whether rendering of the printing data in units of a band is to be performed before the start of shipping of image data of one page, second determining means for determining whether image data in units of a band resulted from rendering is to be subject to data conversion, data converting means for performing data conversion of image data in units of a band, and means for restoring the image data resulted from the data conversion to the original image data, whereby when printing data to be subject to rendering still exists for the band which has been subject to the data conversion by said data converting means, the image data resulted from the data conversion is restored to the original image data by said restoring means and the restored image data is merged with the image data resulted from the rendering of said printing data.

11. A printing data processing method for use with a printing apparatus in which printing data is managed in units of band, and rendering and shipping are performed in units of band in parallel, said method comprising the steps of:

determining whether data conversion of image data is to be performed or not, managing image data through the data conversion, restoring data resulted from the data conversion to the original data in units of a band, merging the restored data with other data in units of a band, shipping the restored data, calculating a size of the printing data, calculating a data size after the data conversion, calculating a time required for rendering, changing the timing of rendering, and determining whether the timing of rendering is to be changed or not.

12. The printing data processing method according to claim 11, wherein the data conversion of the image is performed by a compression process.

13. The printing data processing method according to claim 11, wherein the data conversion of the image is performed by a resolution lowering process and/or a gradation lowering process.

14. The printing data processing method according to claim 11, wherein the determination as to whether the data conversion is to be performed or not includes determination as to which one of plural data conversion types is employed.

15. The printing data processing method according to claim 11, wherein when calculating the data size after the data conversion, the data size is calculated by estimating a size of the compressed data based on the compression type.

16. The printing data processing method according to claim 11, wherein said step of changing the timing of rendering includes the steps of reserving a temporary raster memory and performing rendering of the data into said temporary raster memory prior to shipping of the data.

17. The printing data processing method according to claim 11, wherein the determination as to whether the timing of rendering is to be changed or not is made per band.

18. The printing data processing method according to claim 17, wherein the determination as to whether the timing of rendering of each band is to be changed or not is made by comparing a band rendering time with a threshold determined from a band height and a paper feeding speed.

19. The printing data processing method according to claim 17, wherein the determination as to whether the timing of rendering of each band is to be changed or not is made by comparing a band rendering time with a threshold determined from a time period from the end of rendering of the previous band to the start of rendering of the relevant band.

20. A printing data processing method for use with an apparatus in which printing data is subject to rendering in units of a band, and rendering of one band and shipping of another band having been subject to rendering are performed in parallel, said method comprising:

a first determining step of determining whether rendering of the printing data in units of a band is to be performed before the start of shipping of image data of one page, a second determining step of determining whether image data in units of a band resulted from rendering is to be subject to data conversion, a step of performing data conversion of image data in units of a band in accordance with the determining made in said second determining step, and steps of restoring the image data resulted from the data conversion to the original image data, and merging the original image data restored by said restoring step with the image data resulted form the rendering of said printing data, when printing data to be subject to rendering still exists for the band which has been subject to the data conversion by said data converting step.

* * * * *

UNITED STATES PATENT AND TRADEMARK OFFICE
CERTIFICATE OF CORRECTION

PATENT NO. : 6,124,943
DATED : September 26, 2000
INVENTOR(S) : Keisuke Mitani

Page 1 of 1

It is certified that error appears in the above-identified patent and that said Letters Patent is hereby corrected as shown below:

Column 4,
Line 24, "i" should be deleted.

Column 7,
Line 17, "stores" should read -- store --.

Column 9,
Line 1, "full" should read -- one --;
Line 2, "one" should read -- full --; and
Line 21, "Let" should read -- Let us --.

Column 24,
Line 11, ".LIZ" should be deleted; and
Line 48, "especial" should read -- special --.

Column 25,
Line 37, "claim 1" should read -- claim 4 --.

Signed and Sealed this

Twenty-third Day of October, 2001

Attest:

*Nicholas P. Godici*

NICHOLAS P. GODICI
*Attesting Officer*   *Acting Director of the United States Patent and Trademark Office*